(12) United States Patent
Ko et al.

(10) Patent No.: US 9,801,120 B2
(45) Date of Patent: Oct. 24, 2017

(54) CLIENT-INITIATED TETHERING FOR ELECTRONIC DEVICES

(71) Applicant: Apple Inc., Cupertino, CA (US)

(72) Inventors: Steve S. Ko, Cupertino, CA (US);
Robert B. Ulrich, San Jose, CA (US);
Patrick Coffman, Cupertino, CA (US);
Jeremiah Shaw, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/724,154

(22) Filed: May 28, 2015

(65) Prior Publication Data

US 2015/0351004 A1    Dec. 3, 2015

Related U.S. Application Data

(60) Provisional application No. 62/005,773, filed on May 30, 2014.

(51) Int. Cl.
| | | |
|---|---|---|
| *H04M 1/66* | (2006.01) | |
| *H04W 48/16* | (2009.01) | |
| *H04W 4/00* | (2009.01) | |
| *H04W 12/06* | (2009.01) | |
| *H04W 12/08* | (2009.01) | |
| *H04L 29/06* | (2006.01) | |
| *H04W 84/12* | (2009.01) | |
| *H04W 88/04* | (2009.01) | |

(52) U.S. Cl.
CPC ........... *H04W 48/16* (2013.01); *H04L 63/083* (2013.01); *H04W 4/008* (2013.01); *H04W 12/06* (2013.01); *H04W 12/08* (2013.01); *H04W 84/12* (2013.01); *H04W 88/04* (2013.01)

(58) Field of Classification Search
CPC .. H04W 12/08; H04W 48/16; H04L 12/2803; H04L 12/2834; H04L 63/20
USPC ........................................................ 455/411
See application file for complete search history.

(56) References Cited

U.S. PATENT DOCUMENTS

| | | | | |
|---|---|---|---|---|
| 2013/0148568 A1* | 6/2013 | Iimori | ................... | H04W 40/02 |
| | | | | 370/315 |
| 2013/0331028 A1* | 12/2013 | Kuehnel | ............... | H04W 76/02 |
| | | | | 455/41.1 |
| 2014/0155050 A1* | 6/2014 | Choi | ...................... | H04W 4/206 |
| | | | | 455/418 |
| 2014/0206346 A1* | 7/2014 | Kiukkonen | ....... | H04W 52/0229 |
| | | | | 455/426.1 |
| 2015/0304800 A1* | 10/2015 | Son | ......................... | H04B 7/24 |
| | | | | 455/41.2 |
| 2016/0036514 A1* | 2/2016 | Saida | .................... | H04W 76/02 |
| | | | | 455/405 |

* cited by examiner

*Primary Examiner* — Don N Vo
(74) *Attorney, Agent, or Firm* — Sterne, Kessler, Goldstein & Fox, PLLC

(57) ABSTRACT

The described embodiments include a tethering device that provides a tethering service to client devices. Generally, the tethering service enables a client device to share the tethering device's access to a network. For example, a client device may share the tethering device's access to a cellular network, through which the client device can access the Internet. In the described embodiments, a client device and the tethering device are configured so that the client device causes the tethering device to activate the tethering service without a user performing one or more operations for manually activating the tethering service on the tethering device.

38 Claims, 15 Drawing Sheets

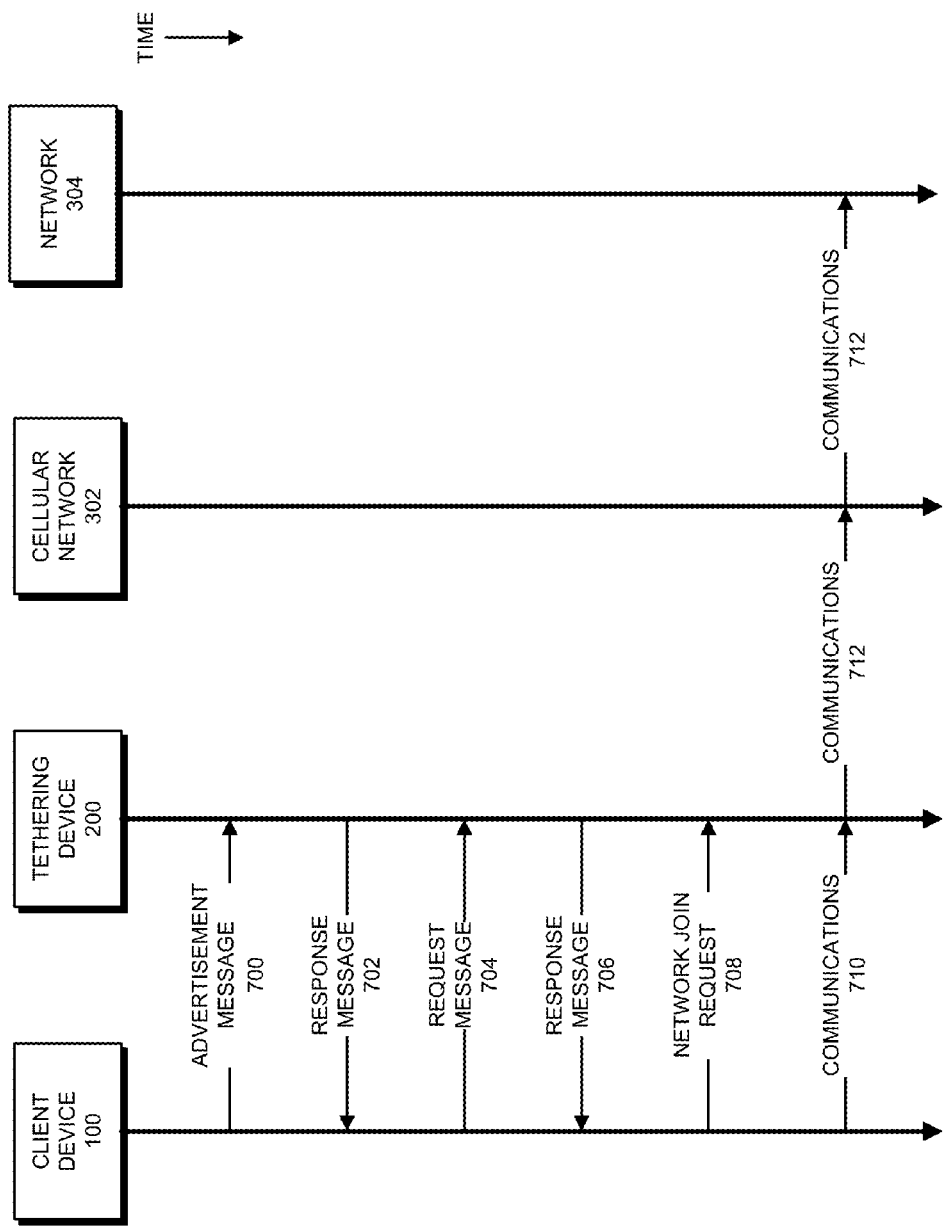

CLIENT-INITIATED TETHERING FOR ELECTRONIC DEVICES

RELATED APPLICATIONS

The instant application is a non-provisional application from, and hereby claims priority to, U.S. provisional patent application No. 62/005,773, which was filed on 30 May 2014, and which is incorporated by reference.

The instant application is related to U.S. provisional patent application No. 62/005,755, which was filed 30 May 2014, which is titled "Operating Mode Transitions based on Advertising Information," by inventors Craig P. Dooley, Akshay Mangalam Srivatsa, Anjali S. Sandesara, and Michael Giles, and which is incorporated by reference. The instant application is also related to U.S. provisional patent application No. 62/005,751, which was filed 30 May 2014, which is titled "Predefined Wireless Pairing," by inventors Jason C. Conn, Akshay Mangalam Srivatsa, Craig P. Dooley, and Michael Giles, and which is incorporated by reference. The instant application is also related to U.S. provisional patent application No. 62/005,781, which was filed 30 May 2014, which is titled "Activity Continuation Between Electronic Devices," by Christopher S. Linn, Keith Stattenfield, Christopher C. Jensen, Alexander R. Ledwith, David A. Carter, Marc Krochmal, John J. Iarocci, and Jonathan M. Grynspan, and which is incorporated by reference. The instant application is also related to U.S. provisional patent application No. 62/005,793, which was filed 30 May 2014, which is titled "Companion Application for Activity Cooperation," by Marc Krochmal, Christopher S. Linn, John J. Iarocci, Geoffrey Stahl, and Jacques P. Gasselin de Richebourg, and which is incorporated by reference.

BACKGROUND

Field

The disclosed embodiments relate to electronic devices. More specifically, the disclosed embodiments relate to techniques for client-initiated tethering for electronic devices.

Related Art

Many modern electronic devices (e.g., smart phones, tablet computers, laptops, etc.) are able to access the Internet. For example, such devices may include a cellular network interface and be configured with an account with a cellular service provider that enables accessing the Internet using a cellular network. Some of these devices (herein referred to as "tethering devices") provide a "tethering" service, which is a service that enables a tethering device to share the access to the Internet with one or more client devices. Tethering devices provide tethering networks that client devices can join and use to access the Internet via the tethering service on the tethering devices. For example, some tethering devices provide a wireless local area network (WLAN) such as a Wi-Fi network or a personal area wireless network (PAN) such as a Bluetooth network that one or more client devices can join and use to access the Internet via the tethering service.

In tethering devices, the tethering service is inactive (i.e., clients cannot access the Internet using the tethering service) until a user manually activates the tethering service. Manually activating the tethering service and then joining the client device to the tethering network to enable the client device to access the tethering service requires a user to perform number of operations. For example, for some tethering devices, a user must retrieve the tethering device (e.g., from a pocket, purse, or other location), unlock or power-up the tethering device, navigate various menus and submenus to reach an interface for activating the tethering service, and then activate the tethering service using a corresponding element in the interface. After the tethering service is activated as described, the tethering device starts to provide the tethering network (i.e., causes a network interface in the tethering device to begin providing the tethering network). The user must then read a password from the interface in the tethering device, navigate to an interface for joining wireless networks on the client device, select the tethering network in the interface in the client device to cause the client device to connect to the tethering network, and enter the password read from the tethering device into an entry box presented by the client device to join the client device to the tethering network. Performing these operations to activate the tethering service and join the client device to the tethering network can be annoying for users.

BRIEF DESCRIPTION OF THE FIGURES

FIG. 7 presents a swim lane diagram illustrating messages and communications exchanged between electronic devices in accordance with some embodiments.

In the figures, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
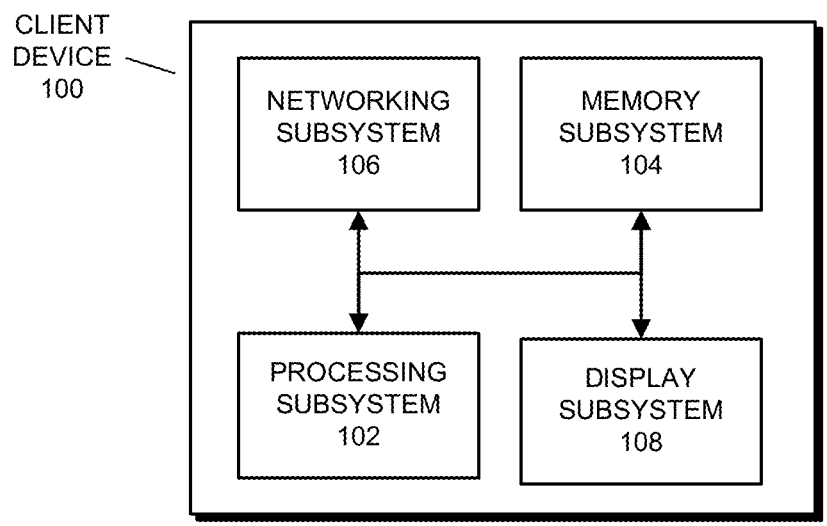
FIG. 1 presents a block diagram illustrating a client device in accordance with some embodiments.
Figure 2:
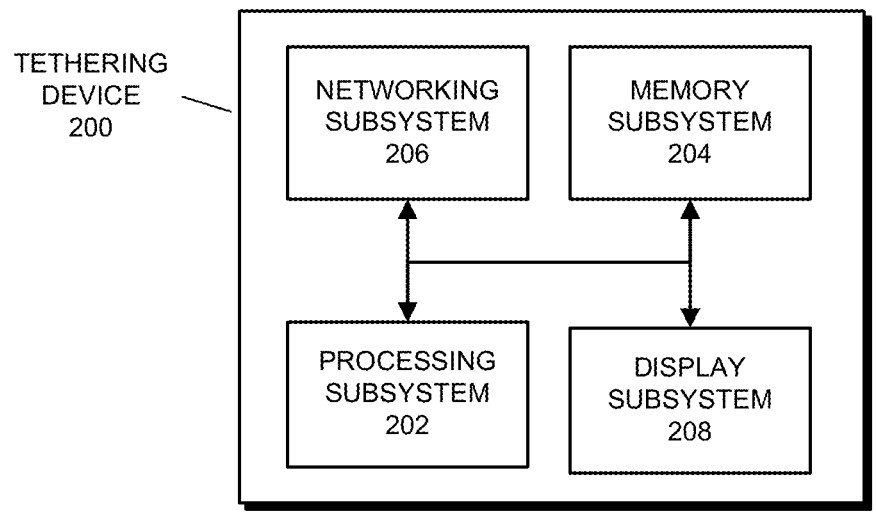
FIG. 2 presents a block diagram illustrating a tethering device in accordance with some embodiments.

In some embodiments, a computing device (e.g., client device 100 in FIG. 1, tethering device 200 in FIG. 2, etc.)

uses code and/or data stored on a computer-readable storage medium to perform some or all of the operations herein described. More specifically, the computing device reads the code and/or data from the computer-readable storage medium and executes the code and/or uses the data when performing the described operations. In these embodiments, a computer-readable storage medium can be any device or medium or combination thereof that stores code and/or data for use by a computing device. For example, the computer-readable storage medium can include, but is not limited to, volatile memory or non-volatile memory, such as semiconductor memories (e.g., flash memory, random access memory (eDRAM, RAM, SRAM, DRAM, DDR, DDR2/DDR3/DDR4 SDRAM, etc.), etc.) and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In this description, functional blocks may be referred to in describing some embodiments. Generally, functional blocks include one or more interrelated circuits, devices, and/or mechanisms that perform described operations. In some embodiments, at least some of the functional blocks include general-purpose processing circuits that execute program code (e.g., microcode, firmware, applications, etc.) that causes the general-purpose processing circuits to perform the described operations.

Overview

The described embodiments include a tethering device that provides a tethering service to client devices. Generally, the tethering service enables a client device to share the tethering device's access to a network. For example, a client device may share the tethering device's access to a cellular network, through which the client device can access the Internet. In the described embodiments, a client device and the tethering device are configured so that the client device causes the tethering device to activate the tethering service without a user performing one or more operations for manually activating the tethering service on the tethering device.

In some embodiments, to cause the tethering device to activate the tethering service, the client device first broadcasts one or more advertisement messages using a first network protocol (e.g., Bluetooth low-energy (BLE), ZigBee, and/or another protocol). Each advertisement message includes an indication that the client device is requesting responses from electronic devices that provide the tethering service. Upon receiving one of the broadcast advertisement messages, the tethering device, which monitors for such advertisement messages, responds with a response message that identifies a wireless network to be provided by the tethering device (i.e., the tethering device indicates that it is capable of providing the identified wireless network, although the wireless network is not currently being provided by the tethering device). Upon receiving the response message and determining that the tethering service is to be activated in the tethering device, the client device sends a request message to the tethering device, the request message requesting the activation of the tethering service. Based on the request, the tethering device activates the tethering service, which causes the tethering device to provide the identified wireless network using a corresponding second network protocol (e.g., Wi-Fi, Bluetooth, etc.). The client device then joins the wireless network and uses the wireless network to access the tethering service in the tethering device in order to share the tethering device's access to a network (e.g., to share access to a cellular network, through which access can be made to the Internet).

By enabling the client device to activate the tethering service on the tethering device without a user performing one or more operations to manually activate the tethering service, the described embodiments simplify the use of the tethering service. This improves the overall user experience for the client device and/or the tethering device.

Client Device

FIG. 1 presents a block diagram illustrating client device 100 in accordance with some embodiments. Client device 100 includes processing subsystem 102, memory subsystem 104, networking subsystem 106, and display subsystem 108.

Processing subsystem 102 is configured to perform computational operations (e.g., instruction execution, data processing, etc.), control operations, event handling operations, and/or other operations. In some embodiments, processing subsystem 102 includes one or more central processing units (CPUs)/CPU cores, graphics processing units (GPUs)/GPU cores, embedded processors, application specific integrated circuits (ASICs), and/or other computational mechanisms.

Memory subsystem 104 is configured to store data and/or instructions for use by other subsystems in client device 100 (e.g., processing subsystem 102, etc.). In some embodiments, memory subsystem 104 includes volatile memory circuits such as dynamic random access memory (DRAM), static random access memory (SRAM), and/or other types of memory that are used for storing the instructions and data, as well as mechanisms for controlling the memory circuits. In some embodiments, memory subsystem 104 includes a memory hierarchy with one or more caches coupled to the memory circuits. In some of these embodiments, processing subsystem 102 also includes one or more caches that are part of the memory hierarchy.

In some embodiments, memory subsystem 104 is coupled to one or more non-volatile high-capacity mass-storage devices (not shown). For example, memory subsystem 104 can be coupled to a magnetic or optical drive, a solid-state drive, or another type of mass-storage device. In these embodiments, memory subsystem 104 can be used by client device 100 as fast-access storage for often-used data, while the mass-storage device is used to store less frequently used data.

Networking subsystem 106 is configured to couple to and communicate on one or more wired and/or wireless networks. For example, networking subsystem 106 can include one or more of a Bluetooth™ networking system, a cellular networking system (e.g., a 3G/4G network such as UMTS, LTE, etc.), a universal serial bus (USB) networking system, a networking system based on the standards described in IEEE 802.11, 802.15, etc. (e.g., a ZigBee or Wi-Fi networking system, etc.), an Ethernet networking system, and/or another networking system. Networking subsystem 106 includes processors, controllers, radios/antennas, sockets/plugs, and/or other devices used for coupling to, communicating on, and handling data and events for each supported networking system. In the following description, the mechanisms used for coupling to, communicating on, and handling data and events on the network for each network system are referred to collectively as the "interface" or "network interface" for the network system.

Display subsystem 108 includes one or more functional blocks and/or devices configured to display information on a visual interface for client device 100. For example, in some embodiments, display subsystem 108 includes graphics processors (GPUs), graphics cards, and/or display screens that are used for displaying the information.

In some embodiments, communication paths (that include one or more buses, wires, and/or connections) are coupled between the functional blocks in client device 100 (processing subsystem 102, memory subsystem 104, etc.), as shown by arrow-headed lines between the elements. The communication paths are used to transmit commands, data, and/or other information between the elements.

Although specific components are used to describe client device 100, in some embodiments, different components and/or subsystems may be present in client device 100. For example, client device 100 may include one or more additional processing subsystems 102, memory subsystems 104, etc. Additionally, one or more of the subsystems may not be present in client device 100 or some or all of the subsystem's functions may be incorporated the other subsystems. Moreover, in some embodiments, client device 100 may include one or more additional subsystems that are not shown in FIG. 1. For example, client device 100 can include, but is not limited to, a data collection subsystem, an audio and/or video subsystem, an alarm subsystem, a media processing subsystem, and/or an input/output (I/O) subsystem.

Client device 100 can be, or can be included in, any device that performs computational operations. For example, client device 100 can be, or can be included in, a desktop computer, a laptop computer, a wearable computing device, a tablet computer, a smart phone, a server, a network appliance, a toy, audio-visual equipment, an automobile, a home appliance, a controller, etc., and/or combinations thereof.

Tethering Device

FIG. 2 presents a block diagram illustrating tethering device 200 in accordance with some embodiments. Tethering device 200 includes processing subsystem 202, memory subsystem 204, networking subsystem 206, and display subsystem 208.

Processing subsystem 202 is configured to perform computational operations (e.g., instruction execution, data processing, etc.), control operations, event handling operations, and/or other operations. In some embodiments, processing subsystem 202 includes one or more central processing units (CPUs)/CPU cores, graphics processing units (GPUs)/GPU cores, embedded processors, application specific integrated circuits (ASICs), and/or other computational mechanisms.

Memory subsystem 204 is configured to store data and/or instructions for use by other subsystems in tethering device 200 (e.g., processing subsystem 202, etc.). In some embodiments, memory subsystem 204 includes volatile memory circuits such as dynamic random access memory (DRAM), static random access memory (SRAM), and/or other types of memory that are used for storing the instructions and data, as well as mechanisms for controlling the memory circuits. In some embodiments, memory subsystem 204 includes a memory hierarchy with one or more caches coupled to the memory circuits. In some of these embodiments, processing subsystem 202 also includes one or more caches that are part of the memory hierarchy.

In some embodiments, memory subsystem 204 is coupled to one or more non-volatile high-capacity mass-storage devices (not shown). For example, memory subsystem 204 can be coupled to a magnetic or optical drive, a solid-state drive, or another type of mass-storage device. In these embodiments, memory subsystem 204 can be used by tethering device 200 as fast-access storage for often-used data, while the mass-storage device is used to store less frequently used data.

Networking subsystem 206 is configured to couple to and communicate on one or more wired and/or wireless networks. For example, networking subsystem 206 can include one or more of a Bluetooth™ networking system, a cellular networking system (e.g., a 3G/4G network such as UMTS, LTE, etc.), a universal serial bus (USB) networking system, a networking system based on the standards described in IEEE 802.11, 802.15, etc. (e.g., a ZigBee or Wi-Fi networking system, etc.), an Ethernet networking system, and/or another networking system. Networking subsystem 206 includes processors, controllers, radios/antennas, sockets/plugs, and/or other devices used for coupling to, communicating on, and handling data and events for each supported networking system. In the following description, the mechanisms used for coupling to, communicating on, and handling data and events on the network for each network system are referred to collectively as the "interface" or "network interface" for the network system.

Display subsystem 208 includes one or more functional blocks and/or devices configured to display information on a visual interface for tethering device 200. For example, in some embodiments, display subsystem 208 includes graphics processors (GPUs), graphics cards, and/or display screens that are used for displaying the information.

In some embodiments, communication paths (that include one or more buses, wires, and/or connections) are coupled between the functional blocks in tethering device 200 (processing subsystem 202, memory subsystem 204, etc.), as shown by arrow-headed lines between the elements. The communication paths are used to transmit commands, data, and/or other information between the elements.

Although specific components are used to describe tethering device 200, in some embodiments, different components and/or subsystems may be present in tethering device 200. For example, tethering device 200 may include one or more additional processing subsystems 202, memory subsystems 204, etc. Additionally, one or more of the subsystems may not be present in tethering device 200 or some or all of the subsystem's functions may be incorporated the other subsystems. Moreover, in some embodiments, tethering device 200 may include one or more additional subsystems that are not shown in FIG. 2. For example, tethering device 200 can include, but is not limited to, a data collection subsystem, an audio and/or video subsystem, an alarm subsystem, a media processing subsystem, and/or an input/output (I/O) subsystem.

Tethering device 200 can be, or can be included in, any device that performs computational operations and provides a tethering service. For example, tethering device 200 can be, or can be included in, a desktop computer, a laptop computer, a wearable computing device, a tablet computer, a smart phone, a server, a network appliance, a toy, audio-visual equipment, an automobile, a home appliance, a controller, etc., and/or combinations thereof.

Network Environment

Figure 3:
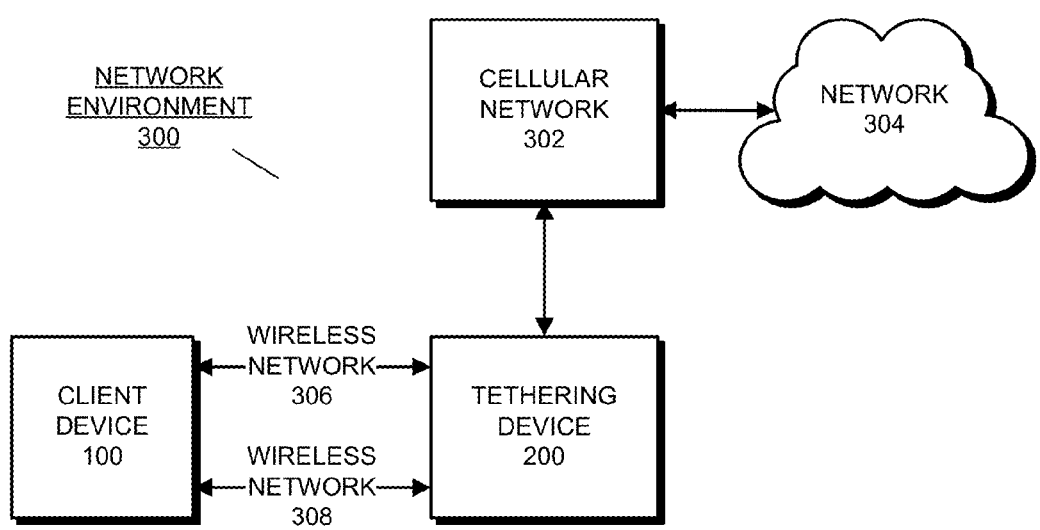
FIG. 3 presents a block diagram illustrating a network environment in accordance with some embodiments.

FIG. 3 presents a block diagram illustrating a network environment in accordance with some embodiments. As can be seen in FIG. 3, network environment 300 includes client device 100, tethering device 200, cellular network 302, and network 304. Cellular network 302 includes interconnected devices (antennas, relays, base stations, gateways, servers, etc.) owned by a cellular network provider and made available for customers of the cellular network provider for accessing network 304, which is a wide area network such as the Internet, a corporate network, etc. In some embodiments, tethering device 200 includes a cellular network interface and is configured with one or more user accounts that enable tethering device 200 to access cellular network 302. Tethering device 200 can access network 304 via cellular network 302.

As described herein, tethering device 200 provides a tethering service that enables client device 100 to share tethering device 200's access to network 304 via cellular network 302. In some embodiments, to enable the tethering, tethering device 200 provides one or more wireless networks 306 that client device 100 can join and use to share tethering device 200's access. For example, the one or more wireless network 306 can include one or more of a wireless local area network (WLAN) such as a Wi-Fi network, a wireless personal area network (PAN) such as a Bluetooth network, etc. In some embodiments, tethering device 200 can also provide a wired network (e.g., universal serial bus (USB), etc.) that client device 100 can use to share tethering device 200's access to cellular network 302.

In the described embodiments, client device 100 and tethering device 200 perform operations to enable client device 100 to activate the tethering service in tethering device 200. To enable these operations, client device 100 and tethering device 200 may exchange communications with one another using a protocol for wireless network 308. For example, wireless network 308 may use a Bluetooth low-energy (BLE) protocol, a Zigbee protocol, etc.

Note that, although various devices and networks are shown in FIG. 3, in some embodiments, a different arrangement of devices and/or networks is used. For example, in some embodiments, cellular network 302 is replaced with another network (wired or wireless). As another example, wireless network 306 may include two or more networks (i.e., tethering device 200 may actually provide multiple networks for accessing the tethering service). Generally, the described embodiments include sufficient devices and networks to perform the operations herein described.

Tethering

As described above, in the described embodiments, tethering device 200 provides a tethering service that enables tethering device 200 to share tethering device 200's access to a network with one or more other electronic devices (e.g., client device 100, etc.). For example, in some embodiments, tethering device 200 is configured to access network 304 via cellular network 302 using a cellular network interface in networking subsystem 206. In these embodiments, tethering device 200 can share tethering device 200's access to network 304 via cellular network 302 with the one or more other electronic devices. In order to share the access to network 304 via cellular network 302, tethering device 200 uses a wireless network interface (e.g., a Wi-Fi network interface, a Bluetooth network interface, etc.) in networking subsystem 206 to establish and/or provide a wireless network 306 that the one or more other electronic devices can join. Tethering device 200/the tethering service then serves as an intermediary, forwarding communications received from the electronic devices via wireless network 306 to network 304 via cellular network 302 and vise versa.

Manually Activating Tethering

In some embodiments, tethering device 200 is configured to enable users to manually activate the tethering service. For example, a user can access an interface for manually activating the tethering service ("the interface") that is provided by tethering device 200 and manually activate the tethering service, thereby causing tethering device 200 to provide the tethering service to one or more other electronic devices (e.g., client device 100, etc.).

In some embodiments, a user manually activates the tethering service by first mousing-over and clicking, fingertapping on a touch screen, or otherwise selecting a "settings" icon presented on a desktop that is displayed on a display screen of tethering device 200. Upon detecting the selection of the settings icon, tethering device 200 pops up a settings window on the desktop. The user then navigates through corresponding options in the settings window (e.g., menu options) to the interface. Once at the interface, the user interacts with a corresponding element that is presented in the interface to activate the tethering service (e.g., slides a slider button presented in the interface, clicks a radio button, etc.). The tethering service is then activated by tethering device 200.

Once the tethering service is activated, tethering device 200 begins to provide a corresponding wireless network 306 using one or more wireless protocols (i.e., wireless "network" 306 may actually comprise two or more networks provided using different network protocols). For example, tethering device 200 can function as a wireless local area network (WLAN) access point, providing a WLAN such as a Wi-Fi network. As another example, tethering device 200 can provide a wireless personal area network such as a Bluetooth network. The one or more other electronic devices can then join wireless network 306 and access network 304 by sharing tethering device 200's connection to cellular network 302.

In some embodiments, a password is used to join wireless network 306 provided by tethering device 200. For example, tethering device 200 may use a password to avoid unauthorized devices accessing wireless network 306. In some embodiments, after the tethering service is manually activated as described above, the password is presented in the interface by tethering device 200. For example, a dialog that displays the password may be presented in the interface on a display of tethering device 200. To manually join wireless network 306, a user of client device 100 (or another device that is to join wireless network 306) navigates to a network access interface presented by client device 100, selects wireless network 306, and enters the password from the dialog presented by tethering device 200 into the network access interface presented by client device 100.

As can be seen above, a user performs multiple operations to manually activate the tethering service. The embodiments described herein enable a user to activate the tethering service provided by tethering device 200 from client device 100 without performing some of the operations for manually activating the tethering service (i.e., to automatically activate the tethering service). For example, in some embodiments, when the tethering service is automatically activated, the user need not select the "settings" icon, navigate through corresponding options in the settings window to the interface, and interact with a corresponding element to activate the tethering service as described above. In fact, in some embodiments, the user may not have to interact with tethering device 200 at all for the activation of the tethering service (after configuring tethering device 200 as described), as the operations may be performed by tethering device 200 without user input (as described below, tethering device 200 may even be in a low-power state at the commencement of the activation process). In addition, because client device 100 uses access information provided by tethering device 200 (e.g., a password for wireless network 306) to join wireless network 306, the user may not have to perform some operations (e.g., password entry) for joining wireless network 306 on client device 100 to enable using the tethering service.

Acquisition of Pairing Information

In some embodiments, electronic devices that participate in the automatic activation of a tethering service provided by a tethering device (e.g., client device 100 and tethering device 200) perform one or more operations to acquire pairing information such as encryption keys, device information, network details, etc. The pairing information is subsequently used to enable communications between the electronic devices using a corresponding network protocol (e.g., a Bluetooth protocol, a Zigbee protocol, etc.) and/or to verify that the devices recognize each other (e.g., via encrypting messages, etc.). In some embodiments, some of the operations performed to acquire the pairing information are performed via network 304/the Internet and are interchangeably referred to herein as preliminary pairing, predefined pairing, or "cloud pairing." For example, in some embodiments, electronic devices perform the predefined pairing operation that is described in pending U.S. patent application Ser. No. 14/474,466, which was filed on the same day as the instant application, which is titled "Predefined Wireless Pairing," by inventors Jason C. Conn, Akshay Mangalam Srivatsa, Craig P. Dooley, and Michael Giles, which is incorporated by reference as described above.

Figure 4:
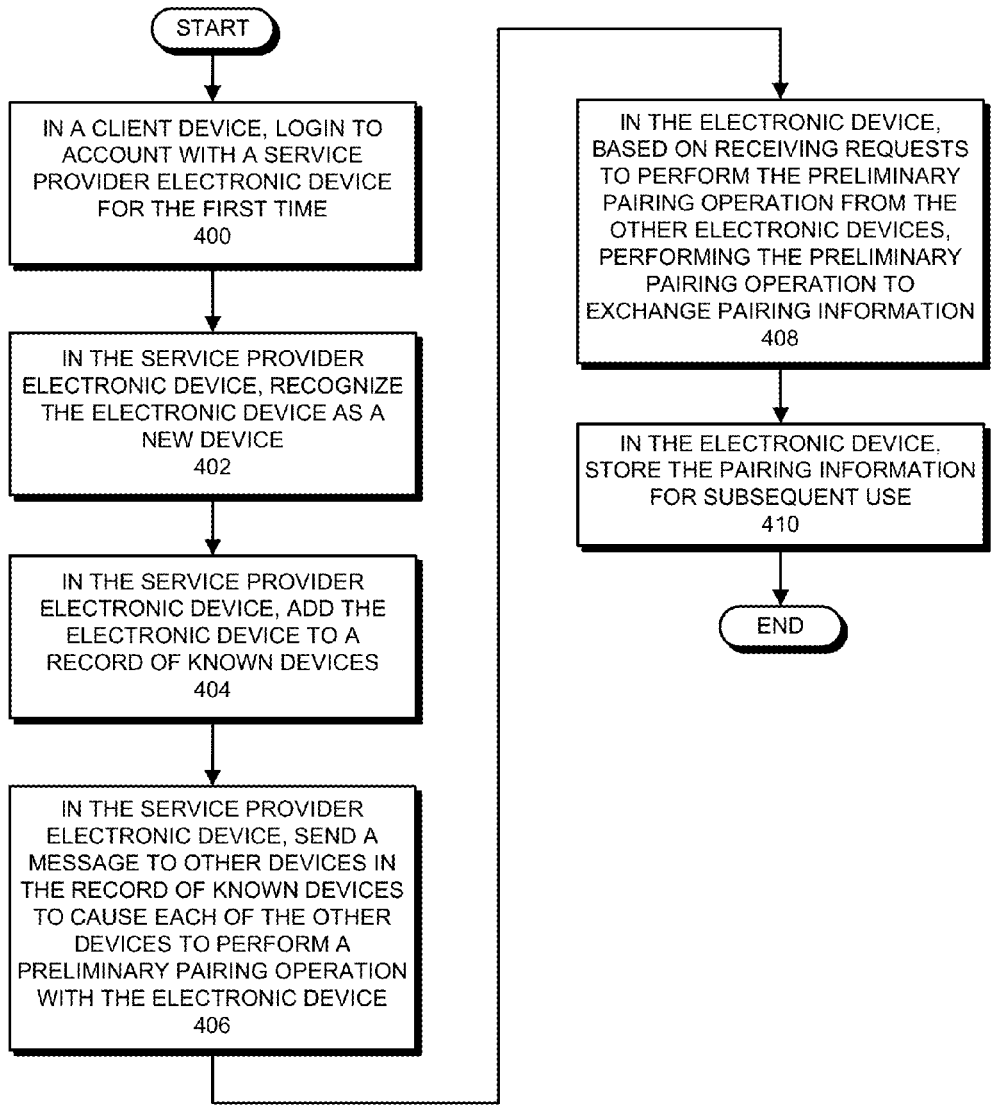
FIG. 4 presents a flowchart illustrating a process for acquiring pairing information in accordance with some embodiments.

FIG. 4 presents a flowchart illustrating a process for acquiring pairing information in accordance with some embodiments. More specifically, during the process shown in FIG. 4, client device 100, which is associated with a user account, communicates with a service provider electronic device (e.g., a service provider electronic device available via network 304/the Internet such as an authentication server, a login server, an account services server, etc.) and other electronic devices associated with the user account (e.g., tethering device 200) to acquire the pairing information. Note that the operations shown in FIG. 4 are presented as a general example of operations performed by some embodiments. The operations performed by other embodiments include different operations and/or operations that are performed in a different order. Additionally, although certain electronic devices are used in describing the operations (e.g., client device 100, tethering device 200, a service provider electronic device, etc.), in some embodiments, other electronic devices perform the operations. For example, tethering device 200 may perform similar operations to acquire pairing information for communicating with client device 100 (instead of client device 100 performing the operations).

Note that, for the example in FIG. 4, client device 100 is assumed to be logging into an account with the service provider electronic device for the first time. Thus, service provider electronic device recognizes client device 100 as a "new" device for the account. However although the operations are described as taking place during a first login, in some embodiments, the process takes place during a different login. In addition, it is assumed that tethering device 200 has already logged in to the account with the service provider electronic device and is therefore a device that is associated with the account by the service provider electronic device.

The process shown in FIG. 4 starts when client device 100 is logged in to an account with a service provider via the service provider electronic device for the first time (step 400). For example, a user of client device 100 can access and log in to the account using an application program that is configured to communicate with the service provider electronic device (e.g., an online store application program, a configuration application program, etc.). As another example, the user of client device 100 can access and log in to the account via a web page provided by the service provider electronic device.

Upon client device 100 logging in to the account, the service provider electronic device recognizes client device 100 as a new device (step 402). For example, the service provider electronic device can acquire device information such as a unique identifier, a MAC address, etc. from client device 100, compare the acquired information to a record of known electronic devices, and determine that client device 100 is as-yet unknown to the service provider electronic device (and thus is a new device). The service provider electronic device then adds client device 100 to a record of known devices (step 404).

In addition to adding client device 100 to the record of known devices, the service provider electronic device sends a message to other devices in the record of known devices to cause each other device to perform a preliminary pairing operation with client device 100 (step 406). Recall that tethering device 200 has been associated with the account by the service provider electronic device and is therefore in the record of known devices, and thus one of the messages is sent to tethering device 200. During the preliminary pairing operation, the above described pairing information, which is generally information used to perform communication between the electronic devices using a corresponding network protocol and to enable the electronic devices to recognize one another, is exchanged between client device 100 and tethering device 200 (step 408). In some embodiments, the pairing information exchanged during the preliminary paring operation includes information such as one or more of the public address of each of client device 100 and tethering device 200, the protocol version of a network interface to be used to communicate between client device 100 and tethering device 200, desired pairing encryption and/or identification keys (which are sometimes referred to as 'pairing keys'), the desired long-term encryption-key LTK length (which is sometimes referred to as a 'key length'), human-readable device names, device identifiers (UUIDs, MAC addresses, etc.) and/or other information.

Client device 100 and each other device (e.g., tethering device 200) then store the pairing information for subsequent use as described herein (step 410).

Configuring Electronic Devices

In some embodiments, one or both of client device 100 and tethering device 200 are configured to enable the automatic activation of the tethering service on tethering device 200. For example, in some embodiments, a user accesses a configuration interface in client device 100 (e.g., a settings window, a menu, etc.) and sets one or more configuration options so that client device 100 searches for electronic devices that provide the tethering service when a user accesses an interface for joining wireless networks (see FIG. 5). As another example, in some embodiments, a user accesses a configuration interface in tethering device 200 (e.g., a settings window, a menu, etc.) and sets one or more configuration options to enable the automatic activation of the tethering service on tethering device 200.

In some embodiments, one of the options that is configured in client device 100 is an identification of tethering electronic devices for which client device 100 is permitted to automatically activate a tethering service and/or to join a wireless network provided by the tethering electronic device. For example, in some embodiments, information (e.g., device identifiers, human-readable device names, etc.) is acquired from such tethering electronic devices and/or from a third party (e.g., the service provider) and stored in client device 100. The stored information can then be retrieved and used to verify that client device 100 is permitted to automatically activate a tethering service and/or to join a wireless network provided by the tethering electronic device at a subsequent time.

In some embodiments, one of the options that is configured for tethering device 200 is the identification of electronic devices that are allowed to automatically enable the tethering service. In some embodiments, tethering device 200 and each electronic device that tethering device 200 is to allow to automatically activate the tethering service (e.g., client device 100) communicate during the configuration operation, the preliminary pairing, or at another time to acquire/exchange device identifiers, etc. These devices can then be enabled to automatically activate the tethering service. In some embodiments, the user selects the devices (e.g., via the configuration interface presented by tethering device 200 and/or the other electronic devices) that are allowed to automatically activate the tethering service. In some embodiments, tethering device 200 receives device identifiers that indicate electronic devices that are allowed to automatically activate the tethering service from a third party electronic device such as a service provider electronic device. For example, one or more electronic devices associated with a user account may be indicated (by the third party electronic device) as electronic devices that are allowed to automatically activate the tethering service.

Activating the Tethering Service on a Tethering Device from a Client Device

In the described embodiments, client device 100 and tethering device 200 are configured so that client device 100 causes tethering device 200 to activate a tethering service without a user performing one or more operations on tethering device 200 for manually activating the tethering service (which is referred to as "automatically" activating the tethering service). In addition, client device 100 joins a wireless network 306 provided by tethering device 200 for accessing the tethering service without a user performing one or more operations for manually joining wireless network 306 on client device 100.

Figure 5:
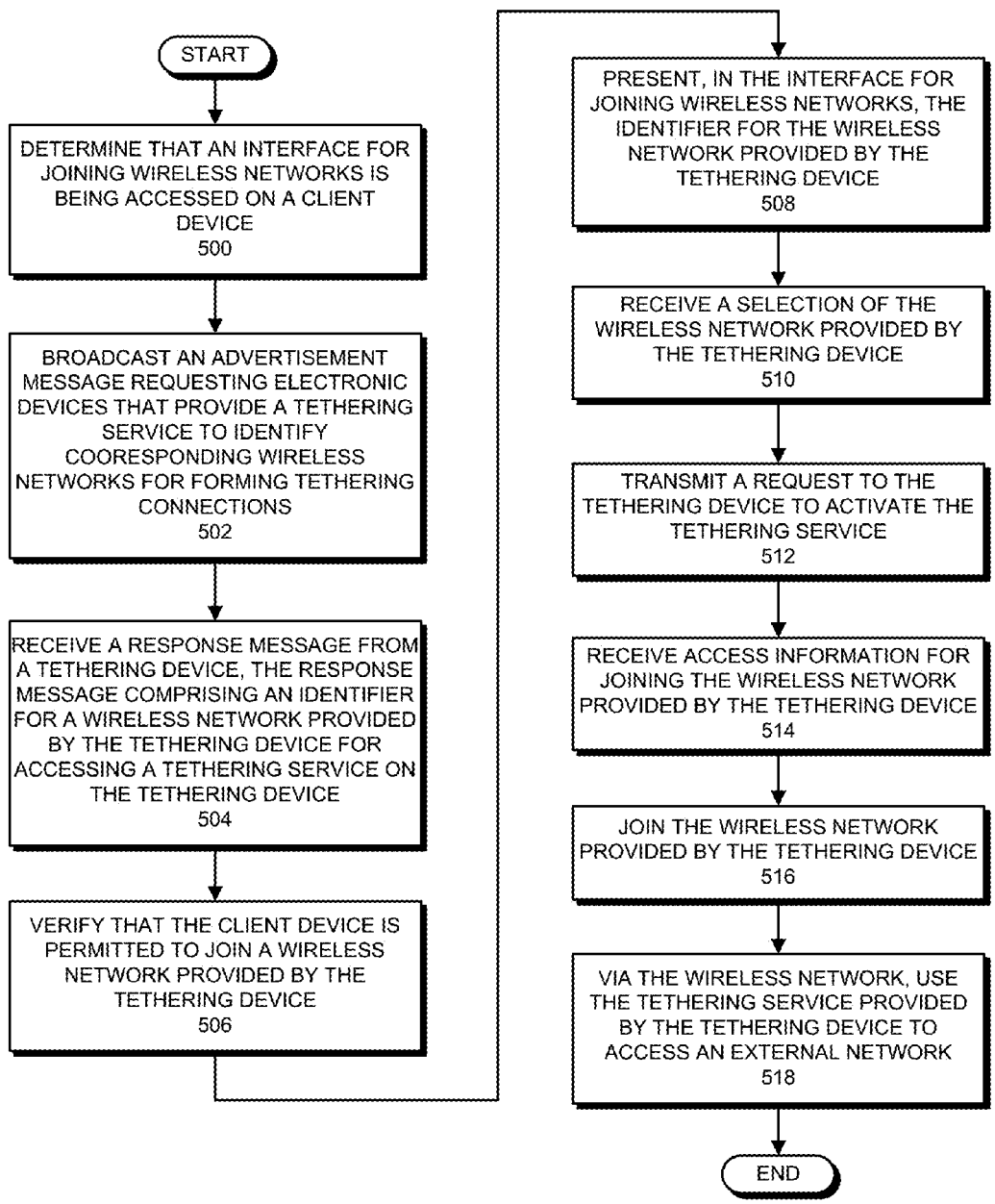
FIG. 5 presents a flowchart illustrating a process for activating a tethering service in a tethering device from a client device and joining the client device to a wireless network provided by the tethering device in accordance with some embodiments.

FIG. 5 presents a flowchart illustrating a process for activating a tethering service in tethering device 200 from client device 100 and joining a wireless network 306 provided by tethering device 200 for accessing the tethering service in accordance with some embodiments. Note that the operations shown in FIG. 5 are presented as a general example of operations performed by some embodiments. The operations performed by other embodiments include different operations and/or operations that are performed in a different order. Additionally, although certain mechanisms are used in describing the operations (e.g., client device 100, tethering device 200, etc.), in some embodiments, other electronic devices perform the operations.

The process shown in FIG. 5 starts when client device 100 determines that an interface for joining wireless networks is being accessed in client device 100 (step 500). For this operation, client device 100 recognizes that a user has accessed an interface (e.g., a menu, a window, etc.) in which client device 100 presents identifiers for wireless networks that are available to client device 100 (i.e., that client device 100 can detect via networking subsystem 106), the interface enabling the user to make a selection of a wireless network that is to be joined. In some embodiments, when a user accesses the interface, client device 100 performs a search for available wireless networks (although client device 100 may also have performed one or more earlier searches to identify networks, so that client device 100 may already have a record of available networks). For example, client device 100 can search/scan for available PANs such as Bluetooth networks, WLANs such as Wi-Fi networks, etc. that are provided by nearby access points, electronic devices, etc. In addition, in some embodiments, client device 100, in accordance with the above-described configuration of client device 100, not only searches for the available wireless networks, but also attempts to automatically activate tethering service in electronic devices that provide the tethering service, thereby causing tethering devices to start providing corresponding wireless networks that were not previously provided (i.e., to make the tethering service and the corresponding wireless network available to client device 100). In some embodiments, the recognition by client device 100 that the interface for joining wireless networks is being accessed serves as a trigger for starting the automatic activation of the tethering service in other electronic devices.

Note that, in some embodiments, events or combination(s) of events other than the access of the interface start the automatic activation of the tethering service in other electronic devices by client device 100. For example, in some embodiments, client device 100 includes a configuration setting and/or an application that enables a user to instruct/cause client device 100 to begin the operation of automatically activating the tethering service on another device (e.g., a specific device such as tethering device 200, any nearby device, etc.). Generally, in the described embodiments, client device 100 may begin the automatic activation of the tethering service in other electronic device(s) based on any suitable event in client device 100. These embodiments may otherwise function similarly to the embodiments shown in FIG. 5 (e.g., may perform some or all of steps 502-518).

Upon determining that an interface for joining wireless networks is being accessed in client device 100 (step 500), client device 100 broadcasts an advertisement message, the advertisement message requesting electronic devices that provide the tethering service to identify corresponding wireless networks to be provided for forming tethering connections (step 502). During this operation, client device 100 first generates the advertisement message (e.g., creates an advertisement message to be broadcast to other electronic devices). In some embodiments, the advertisement message generated by client device 100 includes an indication that client device 100 is searching for electronic devices that provide the tethering service. In these embodiments, the indication may be included in an encoded format such as being represented by one or more bits being set to predetermined values in a particular portion of a header and/or payload of the advertisement message to indicate that the tethering service is the service for which client device 100 is searching. The advertisement message may also be encrypted using a key acquired during the preliminary pairing operation to enable electronic devices that receive the advertisement message to determine that the advertisement message was sent by client device 100 (i.e., by decrypting the advertisement message using a corresponding decryption key) and to determine whether client device 100 is an electronic device that is allowed to automatically activate the tethering service on the electronic device (using a device identifier from the decrypted advertisement message, etc.). Client device 100 then broadcasts the advertisement message using an appropriate interface in networking subsystem 106 for wireless network 308.

In some embodiments, client device 100 uses a low-power protocol such as Bluetooth low-energy (BLE), Zig-Bee, etc. to broadcast the advertisement message on wireless network 308. The advertisement message is formatted and handled in accordance with the underlying protocol (e.g., limited to a corresponding number of bits/bytes, broadcast on a particular schedule, etc.). Tethering device 200 (and other electronic devices that have been so configured) may therefore monitor for advertisement messages broadcast from client device 100 using corresponding low-power mechanisms such as baseband processors.

In some embodiments, tethering device 200 monitors for advertisement messages in a low-power mode (e.g., idle, sleep), and may wake up upon (or after) receiving an advertisement message to perform some or all of the remaining operations. For example, in some embodiments, a baseband processor in tethering device 200 remains active while one or more other subsystems are idled (e.g., processing subsystem 202, networking subsystem 206, etc.) and responds to advertisement messages (see step 504) without waking/activating the idled subsystems. Then, upon receiving the activation request (step 512), the baseband processor may wake/activate one or more other idled subsystems and cause the other subsystems to activate the tethering service. For example, in some embodiments, tethering device 200 monitors for advertisement messages and reacts to received advertisement messages as is described in pending U.S. patent application Ser. No. 14/475,329, which was filed on the same day as the instant application, which is titled "Operating Mode Transitions based on Advertising Information," by inventors Craig P. Dooley, Akshay Mangalam Srivatsa, Anjali S. Sandesara, and Michael Giles, which is incorporated by reference as described above.

Client device 100 then receives a response message (using the protocol in which the advertisement message was sent) from tethering device 200, the response message comprising an identifier for wireless network 306 to be provided by tethering device 200 for accessing the tethering service on tethering device 200 (step 504). Generally, the identifier is a value such as a SSID, a network name, etc. that can be directly or indirectly (e.g., used to look up a value previously stored in client device 100 or elsewhere, etc.) used to describe wireless network 306 to client device 100 and/or a user of client device 100. In some embodiments, the response message received by client device 100 is encrypted by tethering device 200 using an encryption key from the pairing information. This enables client device 100 to determine whether the response message was sent by tethering device 200 (i.e., by decrypting the advertisement message using a corresponding decryption key) and to determine whether tethering device 200 is an electronic device for which client device 100 is allowed to automatically activate the tethering service (using a device identifier from the decrypted advertisement message, etc.).

In addition to the above-described information, in some embodiments, the response message includes information such as battery level, operating load, operating state, software versions, hardware versions, cellular network 302 specifics, etc. for tethering device 200. In these embodiments, client device 100 can use the additional information to determine if the tethering service is to be automatically activated (or not) on tethering device 200. For example, in some embodiments, if the battery level of tethering device 200 is below a threshold level (e.g., the battery is about to become discharged), client device 100 does not automatically activate the tethering service in tethering device 200.

Client device 100 next verifies that client device 100 is permitted to join wireless network 306 to be provided by tethering device 200 (step 506). For example, in some embodiments, client device 100 acquires a device identifier from the decrypted response message and compares the device identifier to stored device identifiers for tethering devices for which client device 100 is permitted to automatically activate a tethering service and/or join a wireless network provided by. In these embodiments, when there is a match, client device 100 determines that that client device 100 is permitted to join the wireless network 306 (and thus is permitted to automatically activate the tethering service for tethering device 200). Here, it is assumed that there is a match.

Client device 100 then presents, in the interface for joining wireless networks, the identifier for wireless network 306 to be provided by tethering device 200 (step 508). For example, in some embodiments, client device 100, in a list of available networks, each of which is described using a corresponding identifier (e.g., SSID), presents the identifier for the network to be provided by tethering device 200. The user can then mouse-over and click, finger-tap on a touch screen, or otherwise select the identifier for wireless network 306 to select wireless network 306 as the wireless network that client device 100 is to join. In some embodiments, along with (or instead of) the identifier, client device 100 presents other information about tethering device 200 and/or wireless network 306 acquired from the response message and/or the pairing information, etc. For example, in some embodiments, along with or instead of the corresponding identifier, client device 100 presents a human-readable name (e.g., "John's Phone") that is acquired from or based on the pairing information or the response message to help the user identify tethering device 200. As another example, in some embodiments, client device 100 presents an indication (e.g., an icon, a particular font for the SSID, etc.) that the identified network is a network to be provided by a tethering electronic device to enable client device 100 to access the tethering service (and so, by joining wireless network 306, client device 100 will be tethered to tethering device 200).

Client device 100 then receives a selection of wireless network 306 to be provided by tethering device 200 (step 510). For example, the user can mouse-over and select the identifier from the above-described list, perform a finger tap of the identifier from the above-described list, etc. By making such a selection, the user indicates to client device 100 that the user wants client device 100 to join wireless network 306 for sharing tethering device 200's access to cellular network 302 (and, via cellular network 302, network 304).

Note that, in this example, it is assumed that the tethering service is not active and thus that tethering device 200 is not providing wireless network 306 at the time that the user makes the selection in step 510, in the sense that tethering device 200 is not sending and/or receiving radio signals relating to wireless network 306. As of step 510, therefore, client device 100 is unable to join wireless network 306 and/or share tethering device 200's access to cellular network 302. As described below, client device 100 subsequently causes tethering device 200 to activate the tethering service, which causes tethering device 200 to begin providing wireless network 306. This enables client device 100 to join wireless network 306, as the user has requested.

Client device 100 then transmits a request message (using the same protocol in which the advertisement message was sent) to tethering device 200 to activate the tethering service provided by tethering device 200 (step 512). In some embodiments, the request message generated by client device 100 includes an indication that client device 100 is requesting the activation of the tethering service. In these embodiments, the indication may be included in an encoded format such as being represented by one or more bits being set to predetermined values in a particular portion of a header and/or payload of the request message to indicate that the tethering service is to be activated. The request message may also be encrypted (and decrypted) in a similar way and for similar reasons to the advertisement message, as described above.

In some embodiments, wireless network 306 is provided using a different protocol than the protocol used to exchange the messages (i.e., the advertisement message, the response message, etc.) between client device 100 and tethering device 200. For example, in some embodiments, the messages are exchanged using a protocol such as BLE or ZigBee and wireless network 306 is provided using a protocol such as Wi-Fi or Bluetooth classic.

Client device 100 then receives a response message that includes a confirmation of the activation of the tethering service and access information for joining wireless network 306 provided by tethering device 200 (step 514). For example, in some embodiments, the access information includes information needed to join and/or login to wireless network 306 for accessing the tethering service such as usernames, passwords, authentication tokens, frequencies/channels, signal timing, etc. that is included in a payload and/or a header of the response message. The response message may also be encrypted (and decrypted) in a similar way and for similar reasons as the messages described above.

Client device 100 acquires the access information from the response message and uses the access information to join wireless network 306 provided by tethering device 200 (step 516). For example, client device 100 can login to wireless network 306 by sending a username and/or password from the access information to tethering device 200.

Once joined to wireless network 306, client device 100 uses the tethering service on tethering device 200 to access cellular network 302 (and via cellular network 302, network 304/the Internet) (step 518). As described above, during this operation, tethering device 200 acts as an intermediary, forwarding communications received from the electronic devices via wireless network 306 to network 304 via cellular network 302 and vise versa.

Note that, although client device 100 is described as using/accessing the tethering service in this description, in some embodiments, client device 100's accesses are made to wireless network 306 normally (as, e.g., such accesses would be made if wireless network 306 was provided by an access point, etc.), without special processing or handling by client device 100 for the tethering service. In these embodiments, client device 100 may be essentially "unaware" that it is using the tethering service when communicating on wireless network 306. In these embodiments, the tethering service in tethering device 200 handles such accesses accordingly (e.g., forwards communications from client device 100 to devices on network 304, forwards communications from devices on network 304 to client device 100, etc.).

Figure 6:
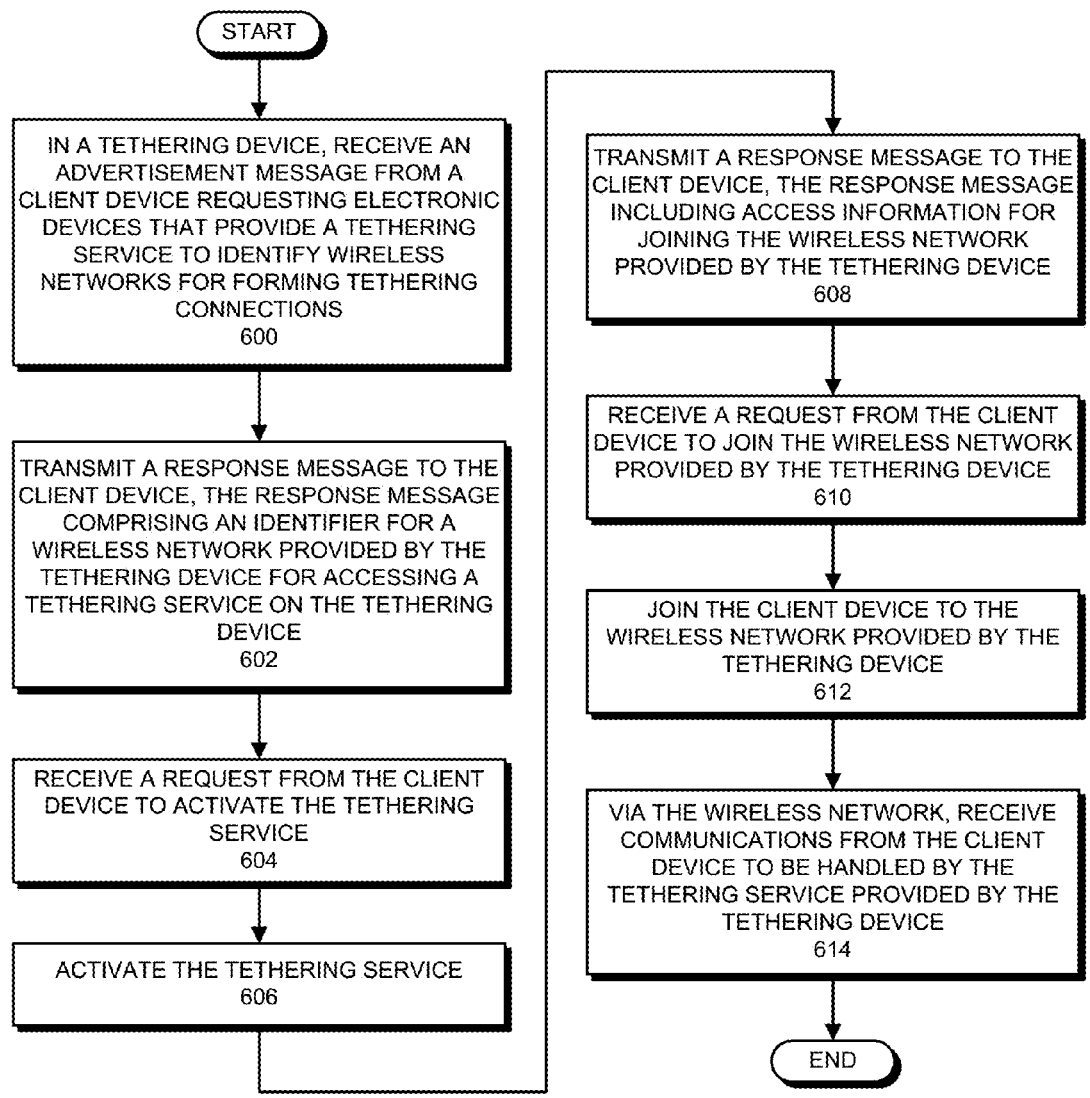
FIG. 6 presents a flowchart illustrating a process for activating a tethering service in a tethering device from a client device and joining the client device to a wireless network provided by the tethering device in accordance with some embodiments.

FIG. 6 presents a flowchart illustrating a process for activating a tethering service in tethering device 200 from client device 100 and joining client device 100 to wireless network 306 provided by tethering device 200 for accessing the tethering service in accordance with some embodiments. Note that the operations shown in FIG. 6 are presented as a general example of operations performed by some embodiments. The operations performed by other embodiments include different operations and/or operations that are performed in a different order. Additionally, although certain mechanisms are used in describing the operations (e.g., client device 100, tethering device 200, etc.), in some embodiments, other electronic devices perform the operations.

The process shown in FIG. 6 starts when tethering device 200 receives an advertisement message broadcast from client device 100, the advertisement message requesting electronic devices that provide the tethering service to identify corresponding wireless networks to be provided for forming tethering connections (step 600). In some embodiments, the advertisement message received from client device 100 includes an indication that client device 100 is searching for electronic devices that provide the tethering service. In these embodiments, the indication may be included in an encoded format such as being represented by one or more bits being set to predetermined values in a particular portion of a header and/or payload of the advertisement message to indicate that the tethering service is the service for which client device 100 is searching. The advertisement message may also be encrypted using a key acquired during the preliminary pairing operation to enable tethering device 200 to determine that the advertisement message was sent by client device 100 (i.e., by decrypting the advertisement message using a corresponding decryption key) and to determine whether client device 100 is an electronic device that is allowed to automatically activate the tethering service on tethering device 200 (using a device identifier from the decrypted advertisement message, etc.).

In some embodiments, client device 100 uses a low-power protocol such as Bluetooth low-energy (BLE), ZigBee, etc. to broadcast the advertisement message on wireless network 308. The advertisement message is formatted and handled in accordance with the underlying protocol (e.g., limited to a corresponding number of bits/bytes, broadcast on a particular schedule, etc.). Tethering device 200 therefore monitors for the advertisement message using corresponding low-power mechanisms such as baseband processors.

In some embodiments, tethering device 200 monitors for advertisement messages in a low-power mode (e.g., idle, sleep), and may wake up upon (or after) receiving an advertisement message to perform some or all of the remaining operations. For example, in some embodiments, a baseband processor in tethering device 200 remains active while one or more other subsystems are idled (e.g., processing subsystem 202, networking subsystem 206, etc.) and responds to advertisement messages (see step 602) without waking/activating the idled subsystems. Then, upon receiving the activation request (step 612), the baseband processor may wake/activate one or more other idled subsystems and cause the other subsystems to activate the tethering service. For example, in some embodiments, tethering device 200 monitors for advertisement messages and reacts to received advertisement messages as is described in pending U.S. patent application Ser. No. 14/475,329, which was filed on the same day as the instant application, which is titled "Operating Mode Transitions based on Advertising Information," by inventors Craig P. Dooley, Akshay Mangalam Srivatsa, Anjali S. Sandesara, and Michael Giles, which is incorporated by reference as described above.

Tethering device 200 then sends a response message (using the protocol in which the advertisement message was sent) to client device 100, the response message comprising an identifier for wireless network 306 to be provided by tethering device 200 for accessing the tethering service on tethering device 200 (step 602). Generally, the identifier is a value such as a SSID, a network name, etc. that can be directly or indirectly (e.g., used to look up a value previously stored in client device 100 or elsewhere, etc.) used to describe wireless network 306 to client device 100 and/or a user of client device 100. In some embodiments, tethering device 200 encrypts the response message using an encryption key from the pairing information to enable client device 100 to determine that the response message was sent by tethering device 200 (i.e., by decrypting the advertisement message using a corresponding decryption key) and to determine whether tethering device 200 is an electronic device for which client device 100 is allowed to automatically activate the tethering service (using a device identifier from the decrypted advertisement message, etc.).

In addition to the above-described information, in some embodiments, the response message includes information such as battery level, operating load, operating state, software versions, hardware versions, cellular network 302 specifics, etc. for tethering device 200. In these embodiments, client device 100 can use the additional information to determine if the tethering service is to be automatically activated (or not) on tethering device 200. For example, in some embodiments, if the battery level of tethering device 200 is below a threshold level (e.g., the battery is about to become discharged), client device 100 does not automatically activate the tethering service in tethering device 200.

Note that, in this example, it is assumed that the tethering service is not active and thus that tethering device 200 is not providing wireless network 306 at the time that the advertisement message is received, in the sense that tethering device 200 is not sending and/or receiving radio signals relating to wireless network 306. As of step 602, therefore, client device 100 is unable to join wireless network 306 and/or share tethering device 200's access to cellular network 302. As described below, client device 100 subsequently causes tethering device 200 to activate the tethering service, which causes tethering device 200 to begin providing wireless network 306. This enables client device 100 to join wireless network 306.

Tethering device 200 then receives a request message (using the same protocol in which the advertisement message was sent) from client device 100 to activate the tethering service provided by tethering device 200 (step 604). In some embodiments, the request message includes an indication that client device 100 is requesting the activation of the tethering service. In these embodiments, the indication may be included in an encoded format such as being represented by one or more bits being set to predetermined values in a particular portion of a header and/or payload of the request message to indicate that the tethering service is to be activated. The request message may also be encrypted (and decrypted) in a similar way and for similar reasons to the above-described messages.

In some embodiments, wireless network 306 is provided using a different protocol than the protocol used to exchange the messages (i.e., the advertisement message, the response message, etc.) between client device 100 and tethering device 200. For example, in some embodiments, the messages are exchanged using a protocol such as BLE or ZigBee and wireless network 306 is provided using a protocol such as Wi-Fi or Bluetooth classic.

Upon receiving the request message, tethering device 200 activates the tethering service (step 606). As describe above, by activating the tethering service, tethering device 200 makes the tethering service available for handling communications received from client device 100 on wireless network 306 that are destined for cellular network 302 (and thence to network 304) and destined for client device 100 from cellular network 302. Additionally, activating the tethering service causes tethering device 200 to begin providing wireless network 306. That is, to send and receive wireless radio signals for wireless network 306 and thereby generally make wireless network 306 available to client device 100 and other electronic devices.

Tethering device 200 then sends a response message to client device 100 (using the same protocol in which the advertisement message was sent) that includes a confirmation of the activation of the tethering service and access information for joining wireless network 306 provided by tethering device 200 (step 608). For example, in some embodiments, the access information includes information needed to join and/or login to wireless network 306 for accessing the tethering service such as usernames, passwords, authentication tokens, frequencies/channels, signal timing, etc. that is included in a payload and/or a header of the response message. The response message may also be encrypted (and decrypted) in a similar way and for similar reasons as the messages described above.

Tethering device 200 next receives a request from client device 100 join wireless network 306 provided by tethering device 200 (step 610). For example, client device 100 can login to wireless network 306 by sending a username and/or password from the access information to tethering device 200. Tethering device 200 then joins client device 100 to the wireless network (step 612). For example, tethering device 200 can compare the username and password from the request from client device 100 to a stored username and password and can determine that there is a match. Based on this determination, tethering device 200 can enable/allow client device 100 to communicate on wireless network 306 (e.g., can handle subsequent communications on wireless network 306 according to the protocol for wireless network 306).

Tethering device 200 then receives, via the wireless network 306, communications from client device 100 that are handled by the tethering service provided by tethering device 200 (step 614). For example, tethering device 200 can receive communications destined for a device on network 304 from client device 100 via wireless network 306 and the tethering service can forward the communications to cellular network 302 for routing to network 304. In addition, tethering device 200 can receive communications destined for client device 100 from a device on network 304 via cellular network 302 and can forward the communications to client device 100 via wireless network 306.

Messages and Communications Exchanged Between a Client Device and a Tethering Device FIG. 7 presents a swim lane diagram illustrating messages and communications exchanged between client device 100 and tethering device 200 in accordance with some embodiments. As can be seen in FIG. 7, the messages and communications are exchanged over a period of time, with advertisement message 700 occurring first in time and the messages and communications lower in FIG. 7 occurring later in time. Although FIG. 7 is shown with messages and communications exchanged in a particular order, in some embodiments, other messages and/or communications are exchanged and/or are exchanged in a different order. Generally, electronic devices in the described embodiments exchange sufficient messages and communications to enable the operations herein described.

The messages and communications in FIG. 7 are generally associated with two operations in client device 100 and tethering device 200: the automatic activation of a tethering service in tethering device 200 by client device 100, and the subsequent use of the tethering service by client device 100 to communicate with network 304 via tethering device 200. The first operation, which includes advertisement message 700, response message 702, request message 704, and response message 706 is the automatic activation of the tethering service. The second operation, which includes network join request 708, communications 710, and communications 712 is the use of the tethering service by client device 100 to communicate with network 304 via tethering device 200. Note that the "association" of the messages and communications in FIG. 7 with particular operations and the identifications for the operations are for illustrative purposes only. Some embodiments use different arrangements or types of operations and/or have different messages and communications associated with the operations.

In some embodiments, the messages shown in FIG. 7 are encrypted and decrypted by sending and receiving electronic devices, respectively. The encryption and decryption may be performed by using corresponding encryption and decryption keys acquired during the above-described preliminary pairing operation and/or using corresponding encryption and decryption keys acquired from another source (e.g., from service provider electronic device). In this way, client device 100 and tethering device 200 can verify that the messages are from authorized devices. In addition, in some embodiments, the messages include authentication information (certificates, etc.) that can be used to verify the sender of the messages.

During the first operation, upon determining that a user has accessed an interface for joining a wireless network in client device 100, client device 100 broadcasts at least one advertisement message 700 (and may, e.g., periodically broadcast advertisement messages 700 at an interval for a specified time, such as 2, 4, etc. times a second for 1, 3, etc. seconds). Recall that advertisement message includes an indication that client device 100 is searching for electronic devices that provide the tethering service. Upon receiving the advertisement message 700 and based on the availability of the tethering service on tethering device 200, tethering device 200 responds with response message 702. Response message 702 includes an identification of wireless network 306 to be provided by tethering device 200 for accessing the tethering service.

Upon receiving response message 702 and determining that response message 702 is from an authorized device, client device 100 presents an identifier for wireless network 306 in the interface for joining a wireless network in client device 100. Upon receiving a selection of wireless network 306 (e.g., receiving a selection input from a user of client device 100), client device 100 determines that wireless network 306 is to be joined. Client device 100 therefore sends request message 704 to tethering device 200. Request message 704 includes a request that tethering device 200 activate the tethering service.

Upon receiving request message 704, tethering device 200 activates the tethering service. For example, tethering device 200 can begin to provide wireless network 306 and can make the tethering service available for handling communications from electronic devices such as client device 100. As described above, it is assumed that the tethering service was not already active in tethering device 200. (In some embodiments, if the tethering service was already active, wireless network 306 is discovered by client device 100 during the above-described search for wireless networks performed by client device 100.)

In addition to activating the tethering service, tethering device 200 sends response message 706 to client device 100. Response message includes an indication that the tethering service has been activated (or, more generally, an acknowledgement). In addition, in some embodiments, response message 706 includes, e.g., in a payload of response message 706, access information for wireless network 306 such as passwords, network traffic schedules (monitoring times and channels, etc.), SSIDs, usernames, etc.

During the second operation, client device 100 sends a network join request 708 to tethering device 200 (the "joining" including enabling client device 100 to send and receive communications on wireless network 306). For example, client device 100 can send a request formatted in accordance with a protocol for wireless network 306 to join wireless network 306, which can be a part of a (possibly multi-message) exchange for establishing security/encryption, configuring radios, etc. for joining wireless network 306. Although not shown in FIG. 7, tethering device 200 may confirm the joining of wireless network 306 via one or more response messages.

When client device 100 has joined wireless network 306, client device 100 then sends communications 710, which can include one or more packets, messages, etc. formatted in accordance with the protocol for wireless network 306, to tethering device 200 via wireless network 306. These communications can be destined for one or more devices on network 304. In this case, the tethering service in tethering device 200 handles, modifies, and/or changes the communications 710 to prepare the communications to be transmitted on cellular network 302, thereby creating communications 712 from/based on communications 710. Tethering device 200 then forwards communications 712 on cellular network 302, which in turn forwards communications 712 to network 304. The communications are routed on network 304 to the corresponding one or more devices.

In some embodiments, advertisement message 700, response message 702, request message 704, and response message 706 are exchanged using a first network protocol such as BLE, ZigBee, etc. used for wireless network 308. In these embodiments, network join request 708 and communications 710 are exchanged using a second network protocol such as Wi-Fi, Bluetooth, etc. used for wireless network 306. Thus, initial communications relating to the automatic activation of the tethering service (and thus the activation of wireless network 306 provided by tethering device 200) are exchanged using a different network protocol than the subsequent communications on/for the wireless network provided by tethering device 200.

User Interfaces and Associated Processes

FIGS. 8A-8D illustrate user interfaces for simplifying the sharing of a second device's (e.g., tethering device 200 in FIGS. 2 and 3) network connection with a first device (e.g., client device 100 in FIGS. 1 and 3) in accordance with some embodiments. The embodiments in these figures are used to illustrate the processes described below, including the processes described with reference to FIGS. 9A-9E.

Figure 8A:
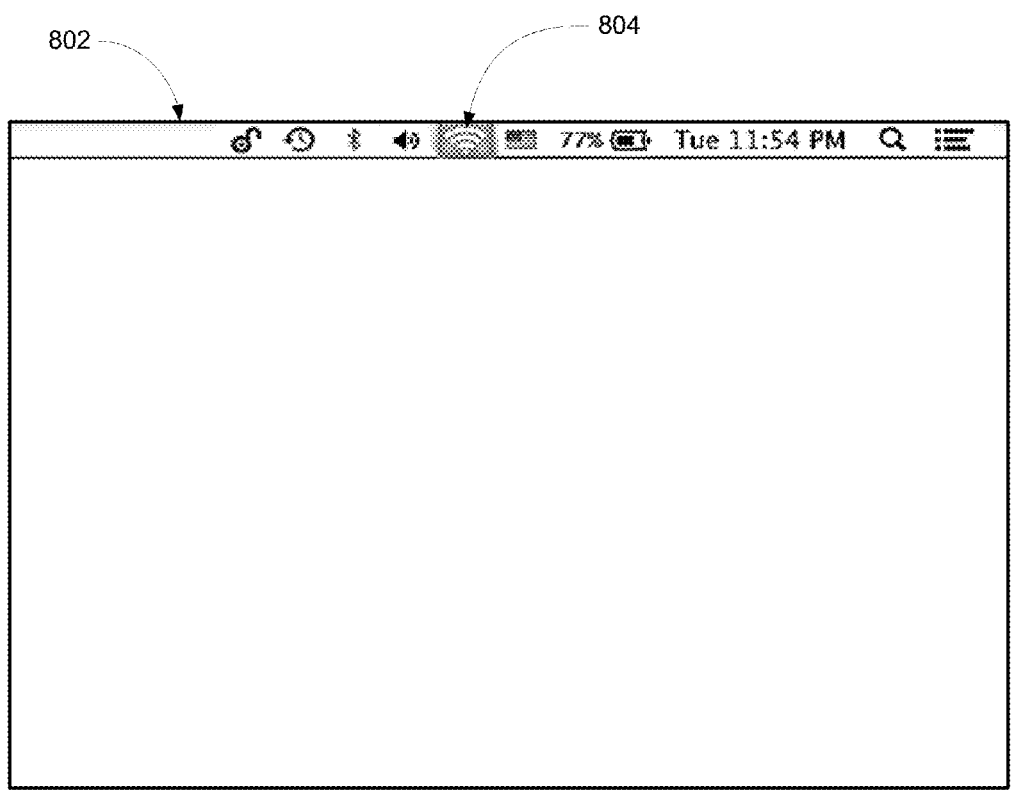
FIGS. 8A-8D illustrate exemplary user interfaces for sharing a second device's network connection with a first device in accordance with some embodiments.

FIG. 8A illustrates an exemplary user interface 802 displayed by a first device, such as client device 100 in FIGS.

1 and 3. User interface 802 is optionally displayed by device 100 using display subsystem 108. In some embodiments, user interface 802 optionally includes a network connectivity icon 804, which, when selected, optionally causes the first device to display connectivity options available to the first device (e.g., displaying an interface for joining wireless networks that includes wireless connectivity options such as available WiFi networks and devices that are capable of tethering with the first device via Bluetooth, USB or other network connections) for connecting the first device to a data network (e.g., the Internet, a local area network, a metropolitan area network, or the like, such as cellular network 302 and/or network 304 in FIG. 3).

Figure 8B:
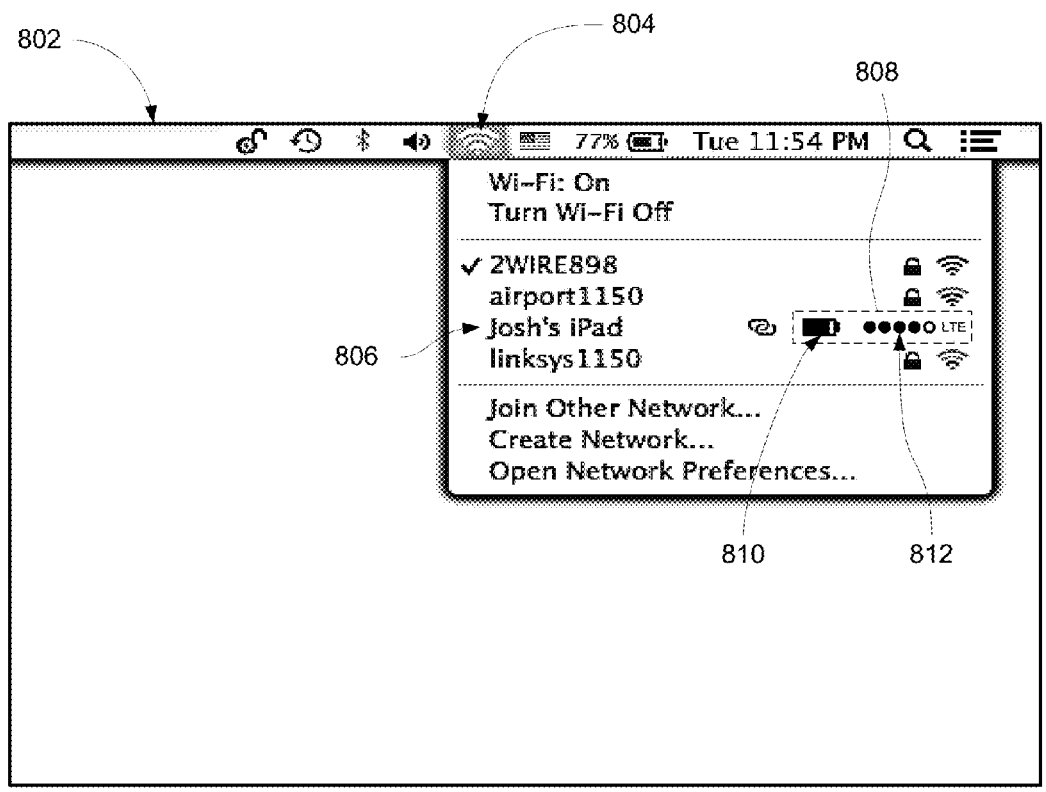

FIG. 8B illustrates an exemplary user interface 802 that includes a plurality of connectivity options available to the first device. The connectivity options are optionally displayed in response to the first device receiving a request to display the connectivity options (e.g., detecting a selection of network connectivity icon 804 in FIG. 8A). The connectivity options optionally include various connections available to the first device (e.g., "2WIRE989", "airport1150", and "linksys1150). In some embodiments, when a second device (e.g., tethering device 200 in FIGS. 2 and 3) with networking connection sharing capabilities is available to share a network connection with the first device (e.g., cellular network data sharing capabilities via wired or wireless tethering), the connectivity options optionally also include a representation of the second device 806 to represent another connection that is available to the first device. The representation of the second device 806 optionally includes status information 808 about the second device. In some embodiments, the representation of the second device 806 is displayed even when the second device 806 is not actively sharing its network connection.

In some embodiments, status information 808 includes an indication of a signal strength 812 of the network connection that is available to be shared by the second device (e.g., a cellular signal strength of the second device's connection to a cellular network, such as cellular network 302 in FIG. 3). In the illustrated embodiment in FIG. 8B, the signal strength indicator 812 also includes an indication of the cellular network type (e.g., 3G, 4G, LTE), which in other embodiments, optionally reflects the type of network connection that the second device in those embodiments has with the data network (whether wired, wireless, etc.). In some embodiments, status information 808 also includes an indication of a remaining battery life 810 of the second device.

The representation of the second device 806 is optionally selectable to cause the first device to establish a network connection sharing session (e.g., a tethering connection via wireless networks 306 and 308) with the second device.

Figure 8C:
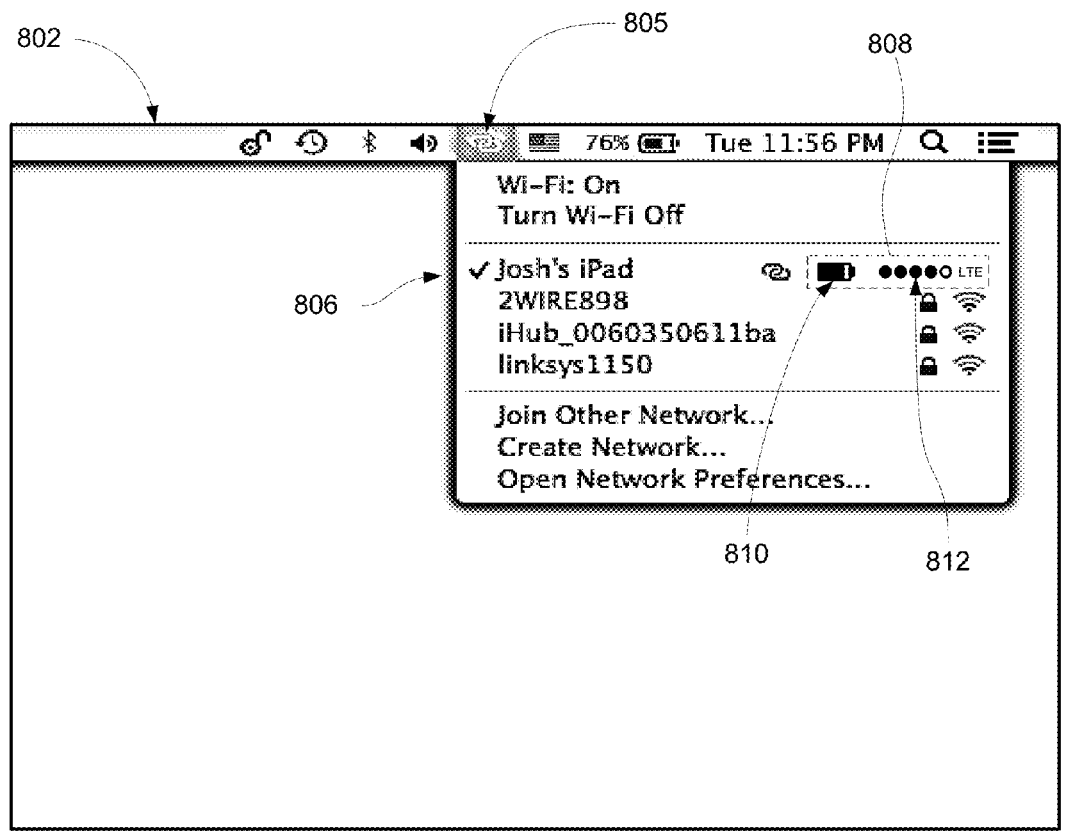

FIG. 8C illustrates an exemplary user interface 802 that is optionally displayed by the first device after the first device detects selection of the representation of the second device 806 in the plurality of connectivity options in FIG. 8B. As illustrated in FIG. 8C, the representation of the second device 806 continues to include status information 808, as before. However, the fact that a network connection sharing session (e.g., a tethering connection) between the first device and the second device has been established is optionally indicated by the representation of the second device 806 being moved to the top of the list of connectivity options, and the addition of the check-mark next to the representation. Additionally, network connectivity icon 804 in FIG. 8B is optionally replaced with connection-sharing icon 805 in FIG. 8C to signify that a network connection sharing session with the second device has been established.

In some embodiments, connection-sharing icon 805 optionally includes an indication of a signal strength of the network connection that is being shared by the second device (e.g., similar to signal strength indicator 812). In some embodiments, the representation of the signal strength of the network connection that is displayed on the first device (e.g., in connection-sharing icon 805) is updated as the signal strength of the network connection between the second device and the data network changes.

In some embodiments, connection-sharing icon 805 optionally includes an indication of a remaining battery life of the second device (e.g., similar to battery life indicator 810). In some embodiments, the representation of the remaining battery life of the second device (e.g., in connection-sharing icon 805) is updated as the remaining battery life of the second device changes.

Figure 8D:
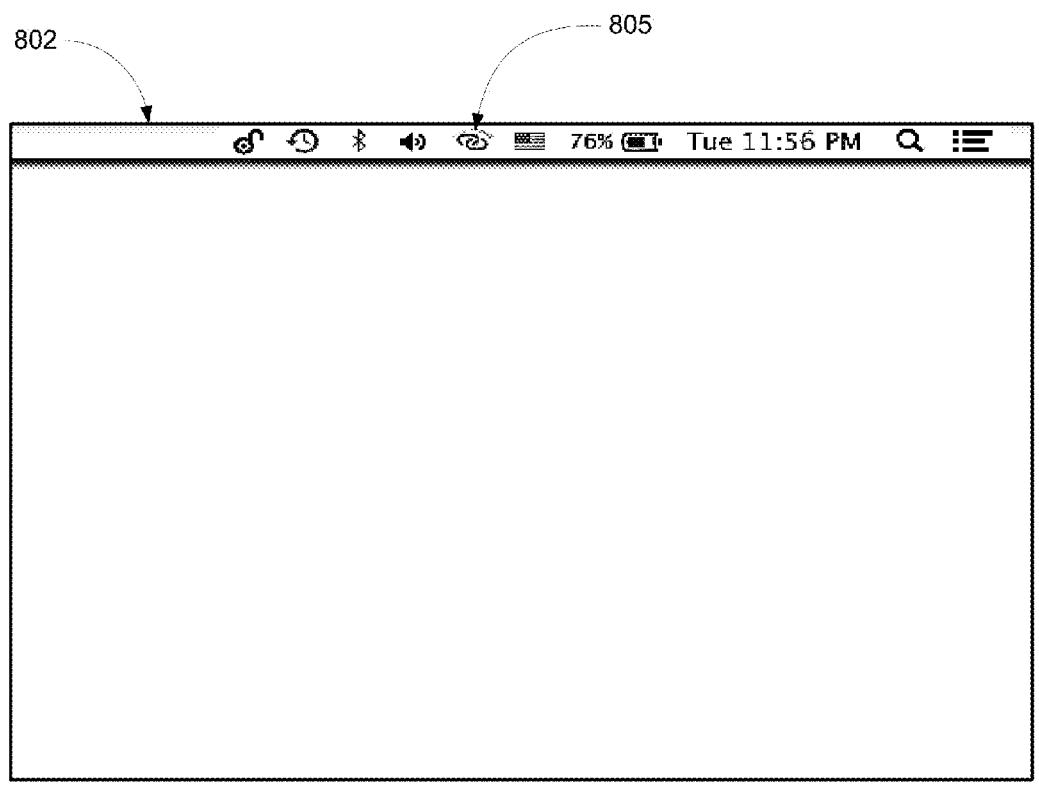
Figure 9A:
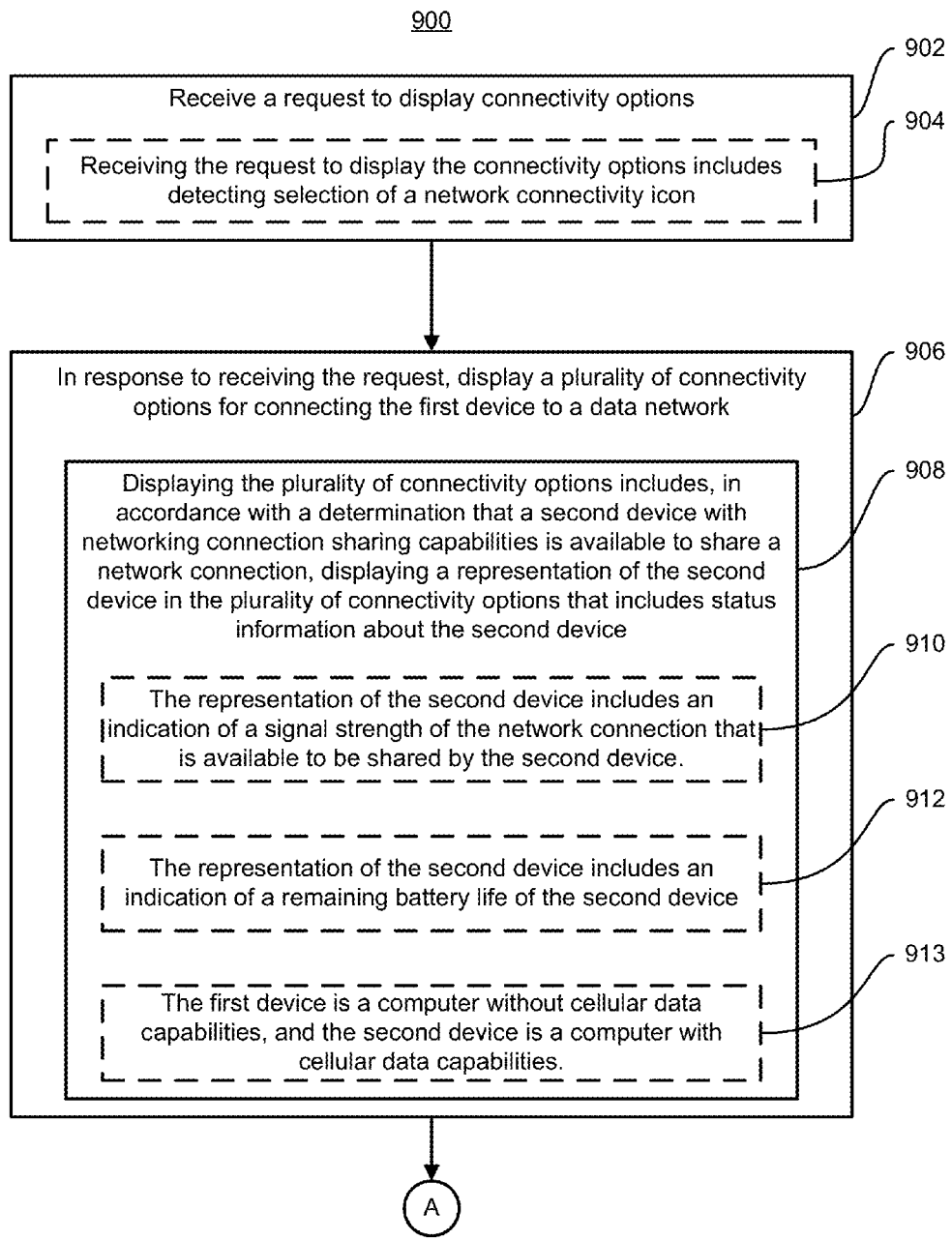
FIGS. 9A-9E present a flowchart illustrating a process for sharing a network connection by a second device with a first device in accordance with some embodiments.
Figure 9B:
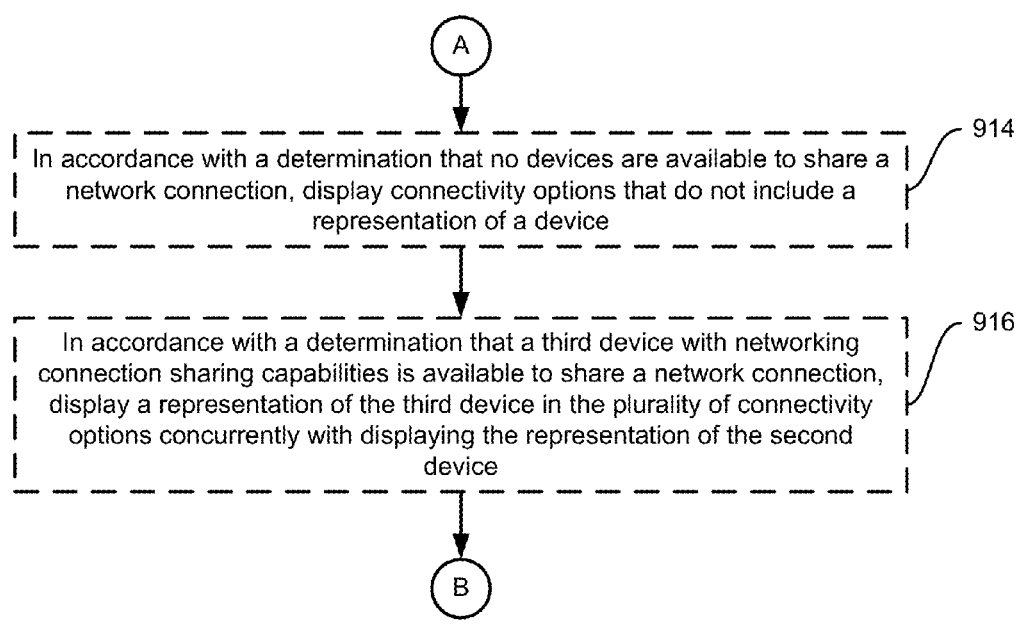
Figure 9C:
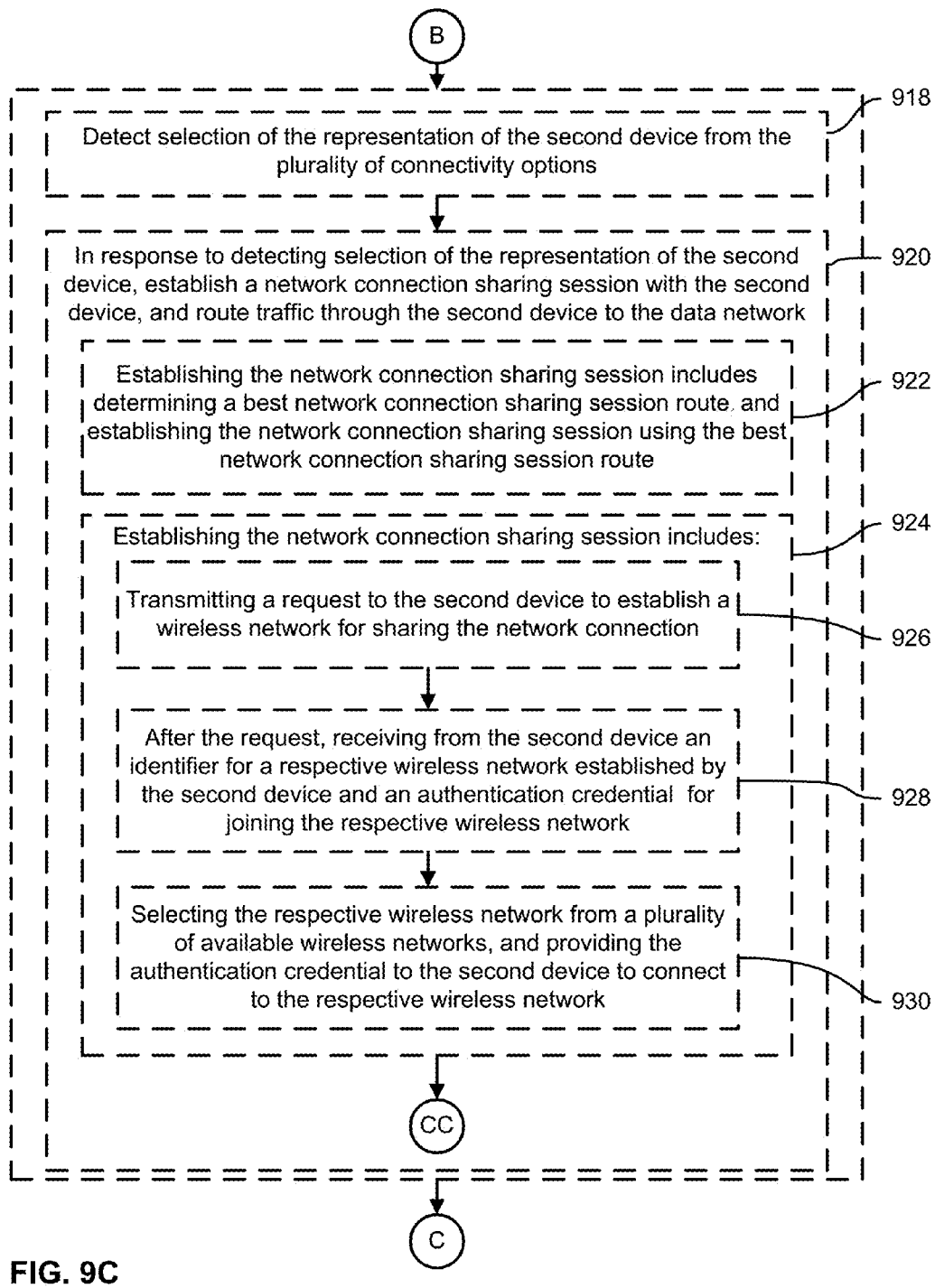
Figure 9D:
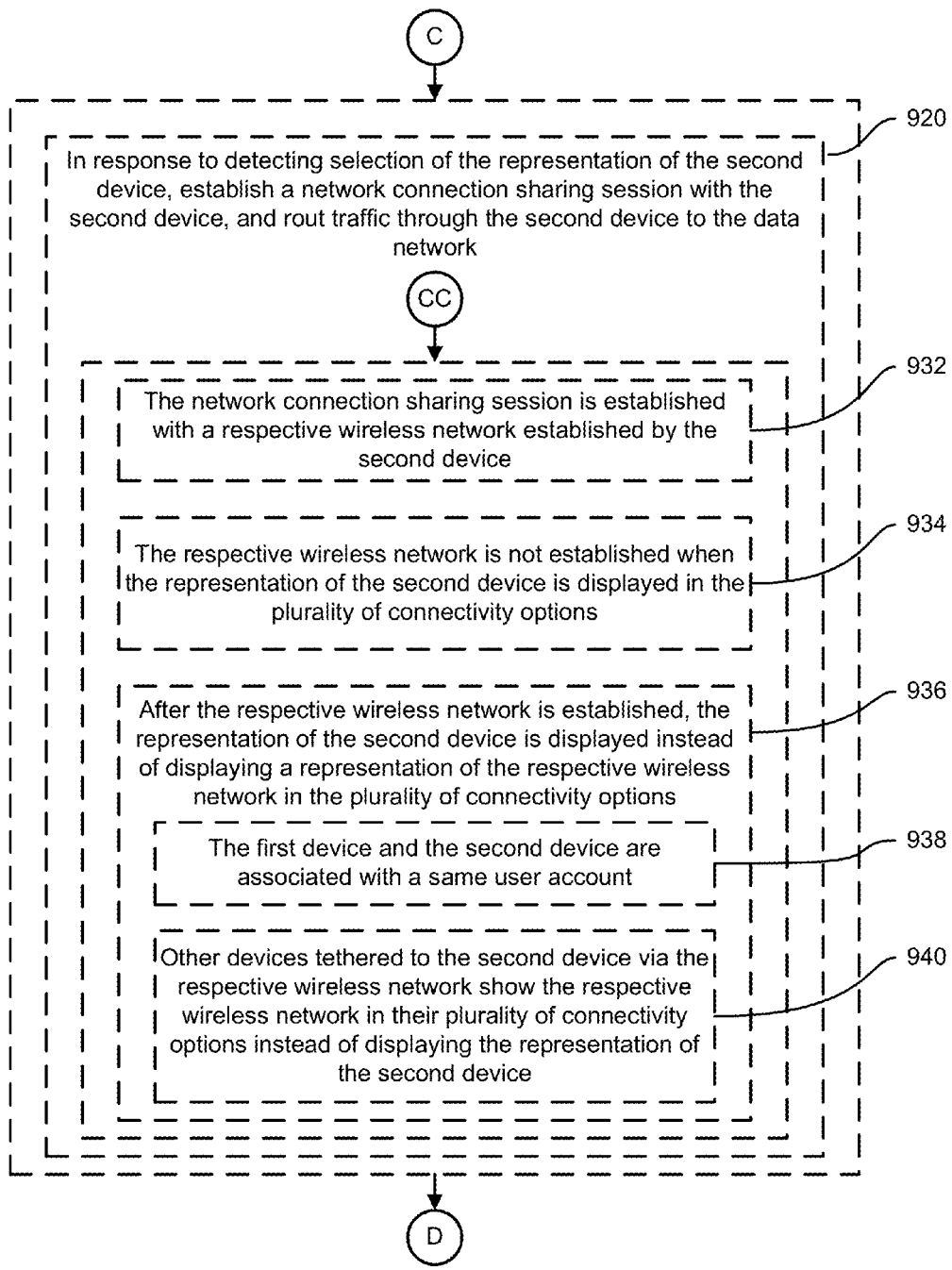
Figure 9E:
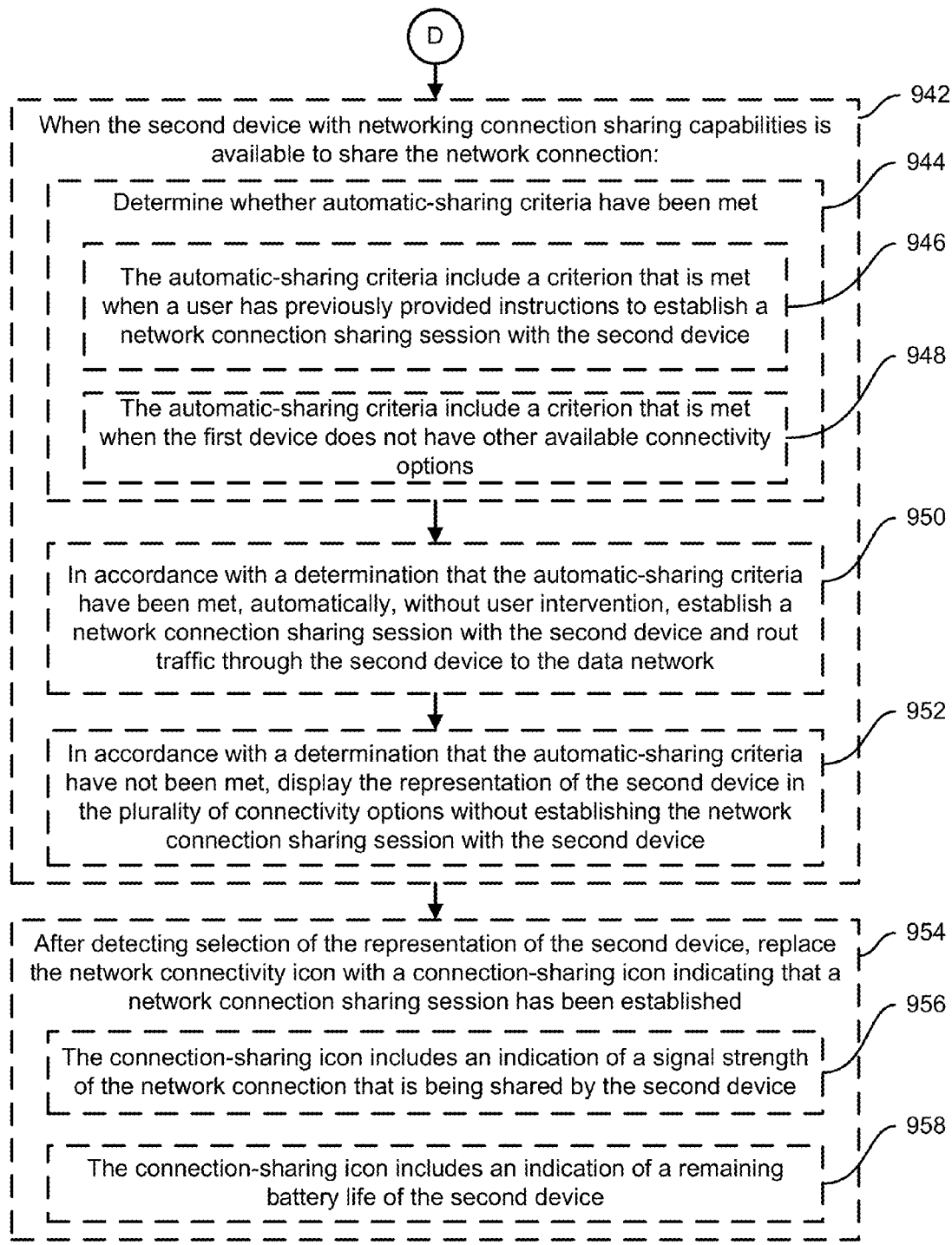

FIG. 8D illustrates an exemplary user interface 802 that is optionally displayed by the first device after the plurality of connectivity options are removed and/or dismissed from display. The connectivity options are optionally dismissed in response to the passing of a certain amount of time (e.g., 5, 10 or 30 seconds) after selection of the representation of the second device 806, and/or detection of a specified input. Connection-sharing icon 805 continues to signify that a network connection sharing session with the second device has been established, as described above with reference to FIG. 8C. In some embodiments, connection-sharing icon 805 includes an indication of the device status of the second device (e.g., a type of network connection such as 3G, 4G, LTE being shared by the second device, or a battery level of the second device). Changing this icon indicates to the user of the first device that the network connection of the second device is being used by the first device (e.g., so that the user is aware if the first device is using a network connection that, in some circumstances, has a different billing arrangement such as pay per use or a data cap, as is the case with many cellular data plans).

FIGS. 9A-9E are flow diagrams illustrating a method 900 of simplifying the sharing of a network connection by a second device with a first device in accordance with some embodiments. The method 900 is optionally performed at a first device such as client device 100 as described above with reference to FIGS. 1 and 3. Some operations in method 900 are, optionally, combined and/or the order of some operations is, optionally, changed.

As described below, the method 900 provides ways in which the sharing of a network connection between two devices is simplified. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, a first device (e.g., client device 100 in FIGS. 1-3) with one or more processors and memory receives (902) a request to display connectivity options (e.g., wireless connectivity options such as available WiFi networks, such as the connectivity options displayed in FIG. 8B). In some embodiments, receiving the request to display the connectivity options (e.g., the connectivity options displayed in FIG. 8B) includes detecting selection of a network connectivity icon (e.g., a menu extra in a menu bar that is used to select a WiFi network for use by the first device, such as network connectivity icon 804 in FIG. 8A) (904).

In some embodiments, in response to receiving the request, the first device displays (906) a plurality of connectivity options (e.g., displaying an interface for joining wireless networks that includes wireless connectivity options such as available WiFi networks and devices that are capable of tethering with the first device via Bluetooth, USB or other network connections, such as the connectivity options displayed in FIG. 8B) for connecting the first device to a data network (e.g., the Internet, a local area network, a metropolitan area network, or the like). Displaying the plurality of connectivity options optionally includes, in accordance with a determination that a second device (e.g., tethering device 200 in FIGS. 2 and 3) with networking connection sharing capabilities is available to share a network connection (e.g., cellular network data sharing capabilities via wired or wireless tethering), displaying a representation of the second device (e.g., representation 806 in FIG. 8B) in the plurality of connectivity options that includes status information (e.g., status information 808 in FIG. 8B) about the second device (908).

In some embodiments, the representation of the second device (e.g., representation 806 in FIG. 8B) includes an indication of a signal strength (e.g., indicator 812 in FIG. 8B) of the network connection that is available to be shared by the second device (910).

In some embodiments, the representation of the second device (e.g., representation 806 in FIG. 8B) includes an indication of a remaining battery life of the second device (e.g., indicator 810 in FIG. 8B) (912).

In some embodiments, the first device is a computer (e.g., a desktop, laptop, or tablet computer) without cellular data capabilities, and the second device is a computer (e.g., a smartphone or tablet computer) with cellular data capabilities (913).

In some embodiments, in accordance with a determination that no devices are available to share a network connection (e.g., cellular network data sharing capabilities via wired or wireless tethering), the first device displays (914) connectivity options that do not include a representation of a device (e.g., a device that is available for tethering).

In some embodiments, in accordance with a determination that a third device with networking connection sharing capabilities is available to share a network connection (e.g., cellular network data sharing capabilities via wired or wireless tethering), the first device displays (916) a representation of the third device (similar to representation 806 in FIG. 8B, but for a third device) in the plurality of connectivity options concurrently with displaying the representation of the second device (e.g., representation 806 in FIG. 8B).

In some embodiments, the first device detects (918) selection of the representation of the second device (e.g., selection of representation 806 in FIG. 8B) from the plurality of connectivity options. In response to detecting selection of the representation of the second device, the first device optionally establishes (920) a network connection sharing session with the second device, and routs traffic through the second device to the data network (e.g., tethering the second device to the first device to enable the first device to share the network connection of the second device). FIG. 8C, for example, illustrates an exemplary resulting user interface that is optionally displayed when selection of representation 806 in FIG. 8B has been detected.

In some embodiments, establishing the network connection sharing session includes determining a best network connection sharing session route (e.g., USB tethering, Bluetooth tethering, WiFi tethering), and establishing the network connection sharing session using the best network connection sharing session route (e.g., taking into account signal interference, battery drain, speed, etc.) (922). In some embodiments, this determination is repeated one or more times while the network connection sharing session is ongoing, and the route for the network connection sharing session is adjusted accordingly (e.g., if the network connection sharing session is occurring over WiFi and the second device is attached to the first device with a USB cable or other wired connection, the network connection sharing session switches automatically, without further user intervention, to using the USB cable rather than the WiFi to share the network connection of the second device with the first device).

In some embodiments, establishing the network connection sharing session includes (924): transmitting (926) a request to the second device to establish a wireless network for sharing the network connection, after the request, receiving (928) from the second device an identifier for a respective wireless network established by the second device and an authentication credential (e.g., a password or security token) for joining the respective wireless network, and selecting (930) the respective wireless network from a plurality of available wireless networks, and providing the authentication credential to the second device to connect to the respective wireless network.

In some embodiments, the network connection sharing session is established with a respective wireless network established by the second device (932), and the respective wireless network is not established when the representation of the second device (e.g., representation 806 in FIG. 8B) is displayed in the plurality of connectivity options (934).

In some embodiments, after the respective wireless network is established, the representation of the second device is displayed instead of displaying a representation of the respective wireless network in the plurality of connectivity options (936).

In some embodiments, the first device and the second device are associated with a same user account (e.g., a same set of login credentials) (938), and other devices tethered to the second device via the respective wireless network show the respective wireless network in their plurality of connectivity options instead of displaying the representation of the second device (e.g., representation 806 in FIG. 8C) (940). For example, devices that are not logged in with the same login credentials as the first and second devices optionally perform normal WiFi tethering rather than seeing the representation of the device that includes enhanced tethering information, such as the signal strength and battery life of the second device.

In some embodiments, when the second device with networking connection sharing capabilities is available to share the network connection (942), the first device: determines (944) whether automatic-sharing criteria have been met, in accordance with a determination that the automatic-sharing criteria have been met, automatically, without user intervention, establishes (950) a network connection sharing session with the second device and routs traffic through the second device to the data network, and in accordance with a determination that the automatic-sharing criteria have not been met, displays (952) the representation of the second device (e.g., representation 806 in FIG. 8B) in the plurality of connectivity options without establishing the network connection sharing session with the second device.

In some embodiments, the automatic-sharing criteria include a criterion that is met when a user has previously provided instructions to establish a network connection sharing session with the second device (946).

In some embodiments, the automatic-sharing criteria include a criterion that is met when the first device does not have other available connectivity options (e.g., no known wired or wireless network connections are available) (948).

As stated above, in some embodiments, receiving the request to display the connectivity options (e.g., the connectivity options displayed in FIG. 8B) includes detecting selection of a network connectivity icon (e.g., a menu extra in a menu bar that is used to select a WiFi network for use by the first device, such as network connectivity icon 804 in FIG. 8A) (904). In some embodiments, after detecting selection of the representation of the second device (e.g., in response to detecting selection of the representation of the second device or after establishing the network connection sharing session), the first device replaces (954) the network connectivity icon (e.g., network connectivity icon 804 in FIG. 8B) with a connection-sharing icon indicating that a network connection sharing session has been established (e.g., connection-sharing icon 805 in FIG. 8C).

In some embodiments, the connection-sharing icon (e.g., connection-sharing icon 805 in FIG. 8C) includes an indication of a signal strength of the network connection that is being shared by the second device (956). In some embodiments, the representation of the signal strength of the network connection that is displayed on the first device is updated as the signal strength of the network connection between the second device and the data network changes.

In some embodiments, the connection-sharing icon (e.g., connection-sharing icon 805 in FIG. 8C) includes an indication of a remaining battery life of the second device (958). In some embodiments, the representation of the remaining battery life of the second device is updated as the remaining battery life of the second device changes.

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods described in FIGS. 4-6) are also applicable in an analogous manner to method 900 described above with respect to FIGS. 9A-9E. For example, the first device, second device and network connection described above with reference to method 900 optionally have one or more of the characteristics of the client device, tethering device and cellular network described herein with reference to other methods described herein (e.g., the methods described in FIGS. 4-6). For brevity, these details are not repeated here.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for activating a tethering service provided by a tethering device, comprising:
   in a client device, performing operations for:
      receiving an indication of an attempt to join a wireless network;
      broadcasting an advertisement message based at least in part on the receiving, the advertisement message including an indication that the client device is searching for a tethering device that provides (1) the tethering service and (2) an identification of a wireless network to be provided by the tethering device for forming tethering connections;
      receiving a response message from the tethering device in response to the broadcasting, the response message comprising the identification of the wireless network to be provided by the tethering device for accessing the tethering service on the tethering device;
      transmitting, to the tethering device, a request to activate the tethering service and thereby causing the tethering device to turn on the wireless network based at least in part on a selection of the wireless network by the client device; and
      joining the wireless network.

2. The method of claim 1, further comprising:
   in the client device, performing operations for:
      receiving, from the tethering device, access information for joining the wireless network; and
      using the access information for joining the wireless network.

3. The method of claim 2, wherein the access information comprises a password for the wireless network and wherein using the access information for joining the wireless network comprises transmitting the password to the tethering device.

4. The method of claim 1, wherein the wireless network uses a network protocol comprising one of:
   an 802.11 wireless protocol; or
   a Bluetooth classic protocol.

5. The method of claim 1, wherein the identification of the wireless network to be provided by the tethering device comprises a service set identifier (SSID) for the wireless network.

6. The method of claim 1, further comprising:
   in the client device, performing operations for:
      accessing an account associated with the client device, the accessing comprising acquiring information for one or more tethering devices for which the client device is allowed to join wireless networks to be provided by the tethering devices; and
      before performing the transmitting and joining, confirming that the information identifies the tethering device.

7. The method of claim 1, wherein the indication that the client device is searching for the tethering device is encoded by one or more bits set to predetermined values in the advertisement message.

8. The method of claim 1, further comprising:
   encrypting the advertisement message using an encryption key acquired during a prior pairing relationship between the client device and the tethering device, wherein the encrypting enables the tethering device to determine that the client device is allowed to automatically activate the tethering service on the tethering device.

9. The method of claim 1, wherein the broadcasting and receiving are performed using a first network protocol, and the wireless network uses a second network protocol that is different than the first network protocol.

10. The method of claim 1, further comprising:
    in the client device, performing operations for:
       presenting information comprising the identification of the wireless network to be provided by the tethering device in a user interface for joining wireless networks; and receiving the selection of the wireless network to be provided by the tethering device via the user interface for joining wireless networks.

11. The method of claim 1, further comprising:
in the client device, performing operations for:
acquiring a device identifier from the response message, wherein the device identifier is associated with the tethering device;
comparing the device identifier to a set of device identifiers for tethering devices the client device is permitted to activate; and
automatically activating, with the client device, the tethering service on the tethering device based at least in part on the comparison.

12. The method of claim 11, wherein the response message further comprises at least one of a battery level, operating load, operating state, software version, and hardware version for the tethering device, and the automatically activating further comprising:
automatically activating, with the client device, the tethering service on the tethering device based on at least one of the battery level, operating load, operating state, software version, and hardware version for the tethering device.

13. The method of claim 1, wherein the wireless network is disabled by the tethering device prior to the transmitting the request to activate the tethering service.

14. The method of claim 1, wherein the wireless network is unknown to the client device prior to the transmitting the request to activate the tethering service.

15. A method for activating a tethering service provided by a tethering device, comprising:
in the tethering device, performing operations for:
monitoring for an advertisement message, the advertisement message including an indication that a client device is searching for a tethering device that provides (1) the tethering service and (2) an identification of a wireless network to be provided by the tethering device for forming tethering connections;
in response to receiving the advertisement message from the client device, transmitting a response message to the client device, the response message comprising the identification of the wireless network to be provided by the tethering device;
receiving, from the client device, a request to activate the tethering service provided by the tethering device based at least in part on a selection of the wireless network to be provided by the tethering device at the client device; and
activating the tethering service based at least in part on the request, wherein the activating comprises turning on the wireless network.

16. The method of claim 15, further comprising:
in the tethering device, performing operations for:
receiving, from the client device, a request to join the wireless network; and
joining the client device to the wireless network.

17. The method of claim 16, further comprising:
in the tethering device, performing operations for:
transmitting, to the client device, access information, the access information configured to be used by the client device to join the wireless network, wherein the request to join the wireless network received from the client device comprises the access information.

18. The method of claim 17, wherein the access information is included in a response message that comprises a confirmation that the tethering service has been activated.

19. The method of claim 15, further comprising:
in the tethering device, performing operations for:
accessing an account associated with the tethering device, the accessing comprising acquiring information for one or more client devices that are allowed to join the wireless network; and
upon receiving the advertisement message, confirming that the information identifies the client device.

20. The method of claim 15, wherein the monitoring, transmitting, and receiving are performed using a BLE protocol.

21. The method of claim 20, wherein the wireless network uses a network protocol other than the BLE protocol.

22. The method of claim 15, wherein the identification of the wireless network to be provided by the tethering device is displayed in a user interface for joining wireless networks at the client device, and the selection of the wireless network to be provided by the tethering device is received via the user interface for joining wireless networks at the client device.

23. A client device that activates a tethering service provided by a tethering device, comprising:
a processing subsystem; and
a networking subsystem;
wherein the processing subsystem and the networking subsystem perform operations for:
receiving an indication of an attempt to join a wireless network;
broadcasting an advertisement message based at least in part on the receiving, the advertisement message including an indication that the client device is searching for a tethering device that provides (1) the tethering service and (2) an identification of a wireless network to be provided by the tethering device for forming tethering connections;
receiving a response message from the tethering device in response to the broadcasting, the response message comprising the identification of the wireless network to be provided by the tethering device for accessing the tethering service on the tethering device;
transmitting, to the tethering device, a request to activate the tethering service and thereby causing the tethering device to turn on the wireless network based at least in part on a selection of the wireless network by the client device; and
joining the wireless network.

24. The client device of claim 23, wherein the processing subsystem and the networking subsystem perform operations for:
receiving, from the tethering device, access information for joining the wireless network; and
using the access information for joining the wireless network.

25. The client device of claim 23, wherein the wireless network uses a network protocol comprising one of:
an 802.11 wireless protocol; or
a Bluetooth classic protocol.

26. The client device of claim 23, wherein the processing subsystem and the networking subsystem perform operations for:
accessing an account associated with the client device, the accessing comprising acquiring information for one or more tethering devices for which the client device is allowed to join wireless networks to be provided by the tethering devices; and before performing the transmitting and joining, confirming that the information identifies the tethering device.

27. The client device of claim 23, further comprising:
a memory subsystem that stores program code that, when executed by at least one of the processing subsystem and the networking subsystem, cause the processing subsystem and the networking subsystem to perform the broadcasting, receiving, transmitting, and joining.

28. The client device of claim 23, wherein the broadcasting and receiving are performed using a first network protocol, and the wireless network uses a second network protocol that is different than the first network protocol.

29. The client device of claim 23, wherein the processing subsystem and the networking subsystem perform operations for:
presenting information comprising the identification of the wireless network to be provided by the tethering device in a user interface for joining wireless networks; and
receiving the selection of the wireless network to be provided by the tethering device via the user interface for joining wireless networks.

30. A tethering device that provides a tethering service, comprising:
a processing subsystem; and
a networking subsystem;
wherein the processing subsystem and the networking subsystem are configured to perform operations for:
monitoring for an advertisement message, the advertisement message including an indication that a client device is searching for a tethering device that provides (1) the tethering service and (2) an identification of a wireless network to be provided by the tethering device for forming tethering connections;
in response to receiving the advertisement message from the client device, transmitting a response message to the client device, the response message comprising the identification of the wireless network to be provided by the tethering device;
receiving, from the client device, a request to activate the tethering service provided by the tethering device based at least in part on a selection of the wireless network to be provided by the tethering device at the client device; and
activating the tethering service based at least in part on the request, wherein the activating comprises turning on the wireless network.

31. The tethering device of claim 30, wherein the processing subsystem and the networking subsystem are configured to perform operations for:
receiving, from the client device, a request to join the wireless network; and
joining the client device to the wireless network.

32. The tethering device of claim 31, wherein the processing subsystem and the networking subsystem are configured to perform operations for:
transmitting, to the client device, access information, the access information configured to be used by the client device to join the wireless network,
wherein the request to join the wireless network received from the client device comprises the access information.

33. The tethering device of claim 32, wherein the access information is included in a response message that comprises a confirmation that the tethering service has been activated.

34. The tethering device of claim 30, wherein the processing subsystem and the networking subsystem are configured to perform operations for:
accessing an account associated with the tethering device, the accessing comprising acquiring information for one or more client devices that are allowed to join the wireless network; and
upon receiving the advertisement message, confirming that the information identifies the client device.

35. The tethering device of claim 30, wherein the monitoring, transmitting, and receiving are performed using a BLE protocol.

36. The tethering device of claim 35, wherein the wireless network uses a network protocol other than the BLE protocol.

37. The tethering device of claim 30, further comprising:
a memory subsystem that stores program code that, when executed by at least one of the processing subsystem and the networking subsystem, cause the processing subsystem and the networking subsystem to perform the monitoring, transmitting, receiving, and activating.

38. The tethering device of claim 30, wherein the identification of the wireless network to be provided by the tethering device is displayed in a user interface for joining wireless networks at the client device, and the selection of the wireless network to be provided by the tethering device is received via the user interface for joining wireless networks at the client device.

* * * * *